US006098297A

United States Patent [19]
Belfiore

[11] Patent Number: 6,098,297
[45] Date of Patent: Aug. 8, 2000

[54] LASER ALIGNMENT TOOL

[76] Inventor: Flavio Carmelo Belfiore, 25 Amaron La., Staten Island, N.Y. 10307

[21] Appl. No.: 09/033,744

[22] Filed: Mar. 3, 1998

[51] Int. Cl.$^7$ .................................................. G01C 15/00
[52] U.S. Cl. ........................ 33/286; 33/293; 33/DIG. 21; 33/533
[58] Field of Search ..................... 33/286, 293, DIG. 21, 33/529, 533, 613, 645

[56] References Cited

U.S. PATENT DOCUMENTS

| | | | |
|---|---|---|---|
| 3,707,330 | 12/1972 | Pine | 33/286 |
| 3,819,273 | 6/1974 | Unema et al. | 33/293 |
| 4,231,161 | 11/1980 | Belfiore | 33/181 R |
| 4,249,294 | 2/1981 | Belfiore | 29/271 |
| 4,968,147 | 11/1990 | Shoemaker | 33/293 |
| 5,293,221 | 3/1994 | Kitajima | 33/293 |
| 5,402,226 | 3/1995 | Mattews et al. | 33/286 |
| 5,465,493 | 11/1995 | Sobottke | 33/286 |
| 5,684,578 | 11/1997 | Nower et al. | 33/286 |
| 5,856,875 | 1/1999 | Duey et al. | 33/286 |

OTHER PUBLICATIONS

"Laser Diode Modules", Letter from Photonetics to Belfiore with Imatronic attachments, May 22, 1997, 17 pages.
"Laser Cross Generators", Fax Message from Imatronic Limited to Belfiore with attachments, May 22, 1997, 6 pages.
"Specialty Focusable Laser Diode Modules", Edmund Scientific Company, May 1, 1997, pp. 11–12.
"ROTALIGN® and OPTALIGN PLUS® laser shaft alignment", Ludeca, Inc., Feb. 21, 1997, 8 pages.
"Owner's Manual, 731 Precision Laser Reference Instrument", Lasers for Construction, Inc., Mar. 1995, 11 pages.
"1142XL Packing List", Spectra–Physics, Nov. 16, 1993, 1 page.
"Product Information, United States Laser Safety", Spectra–Physics, Jul. 1991, 3 pages.
"Model 1142XL and IL LaserLevel™ Operators Manual", Spectra–Physics, 1988, 30 pages.
"Power Transmission Belt Drives/Installation, Maintenance & Troubleshooting Guide", Goodyear, Mar. 1986, pp. 1–32.
"Alignment Tool", Letter from Belfiore to Penguin Air Conditioning Corp., Feb. 2, 1979, p. 1–3.
"Trouble Saver Guide for V Belt Drives/Installation and Preventive Maintenance", Eaton Power Transmission Systems, Mar. 1977, pp. 1–24.

*Primary Examiner*—Diego Gutierrez
*Assistant Examiner*—F. Francis
*Attorney, Agent, or Firm*—Hopgood, Calimafde, Kalil & Judlowe, LLP

[57] ABSTRACT

The laser alignment tool includes a laser beam emitter supported in a projector assembly which, when mounted on a precision alignment component, such as a pulley, is directed at a target assembly mounted on another precision alignment component. The plate of the target assembly against which the laser beam is directed is coated, textured or the like (e.g., has inscribed cross hairs) to produce a distinctive visual effect when struck by the laser with the precision alignment components in the correct or preselected alignment relative to one another. Moreover, if the precision alignment components are not in the correct or preselected alignment, impingement of the laser beam against the target plate does not produce the distinctive visual effect. The target plate may be contoured such that the distinctive visual effect indicates that the precision alignment components are in the correct or preselected alignment relative to one another in additional orientation planes.

3 Claims, 14 Drawing Sheets

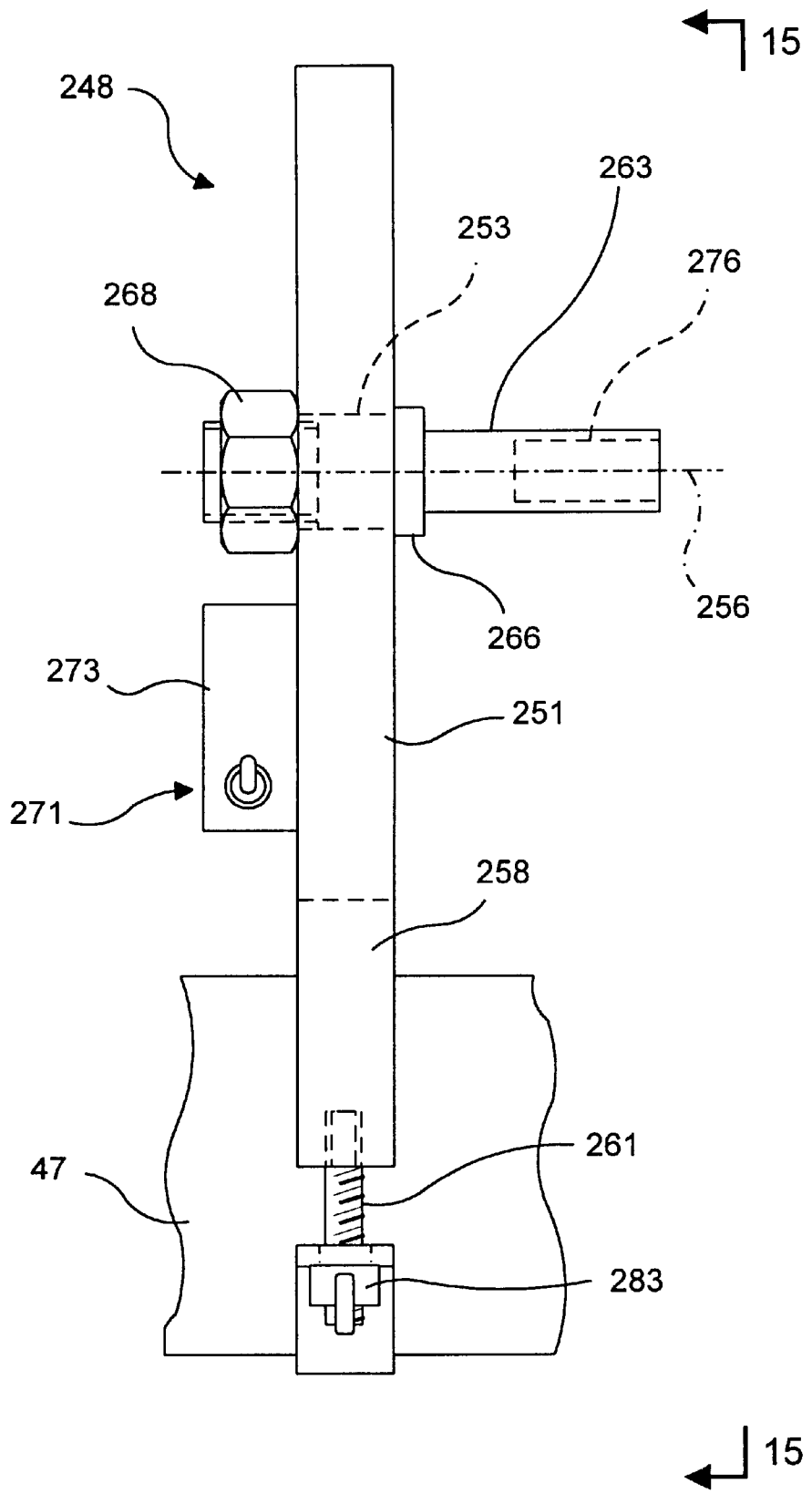
F I G. 14

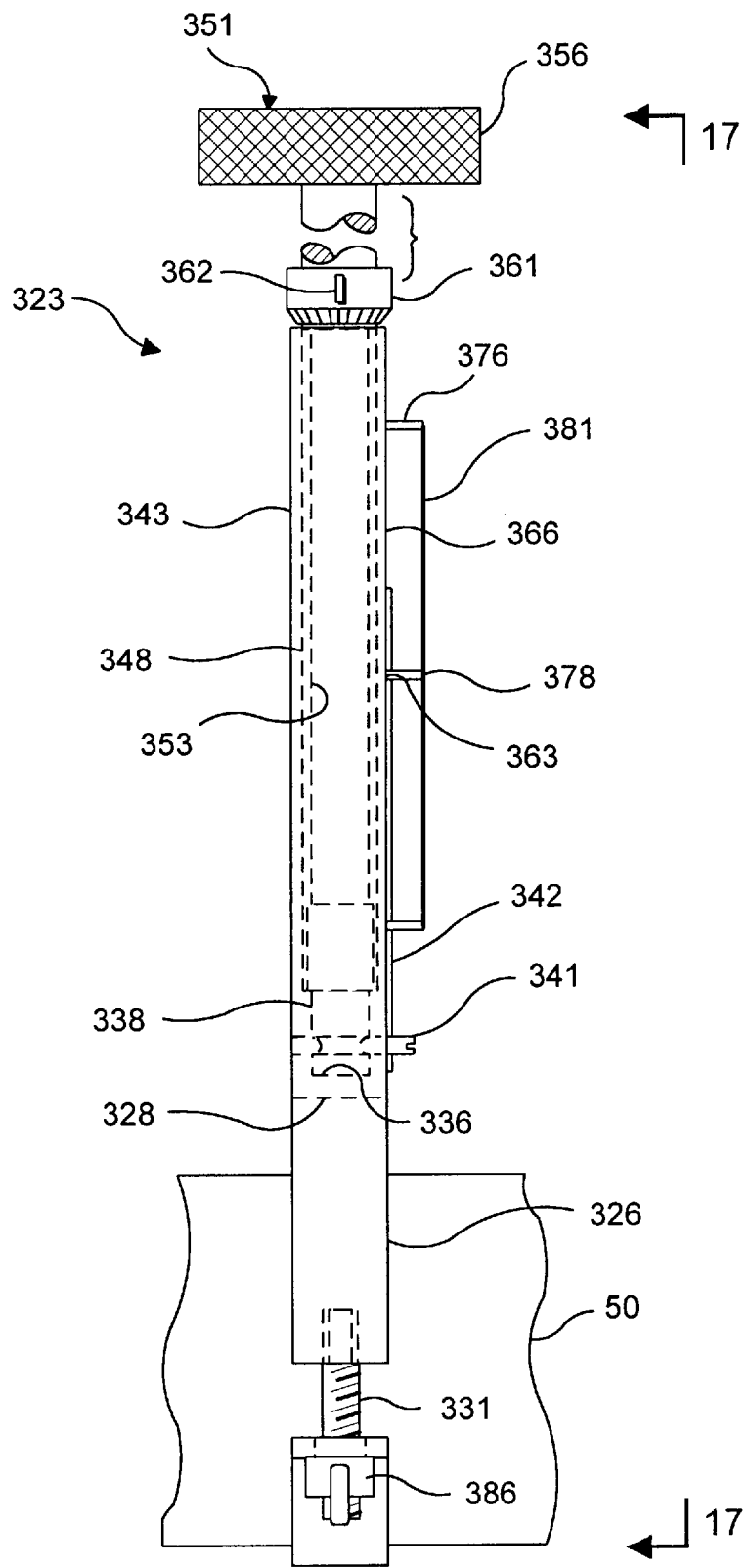
F I G. 16

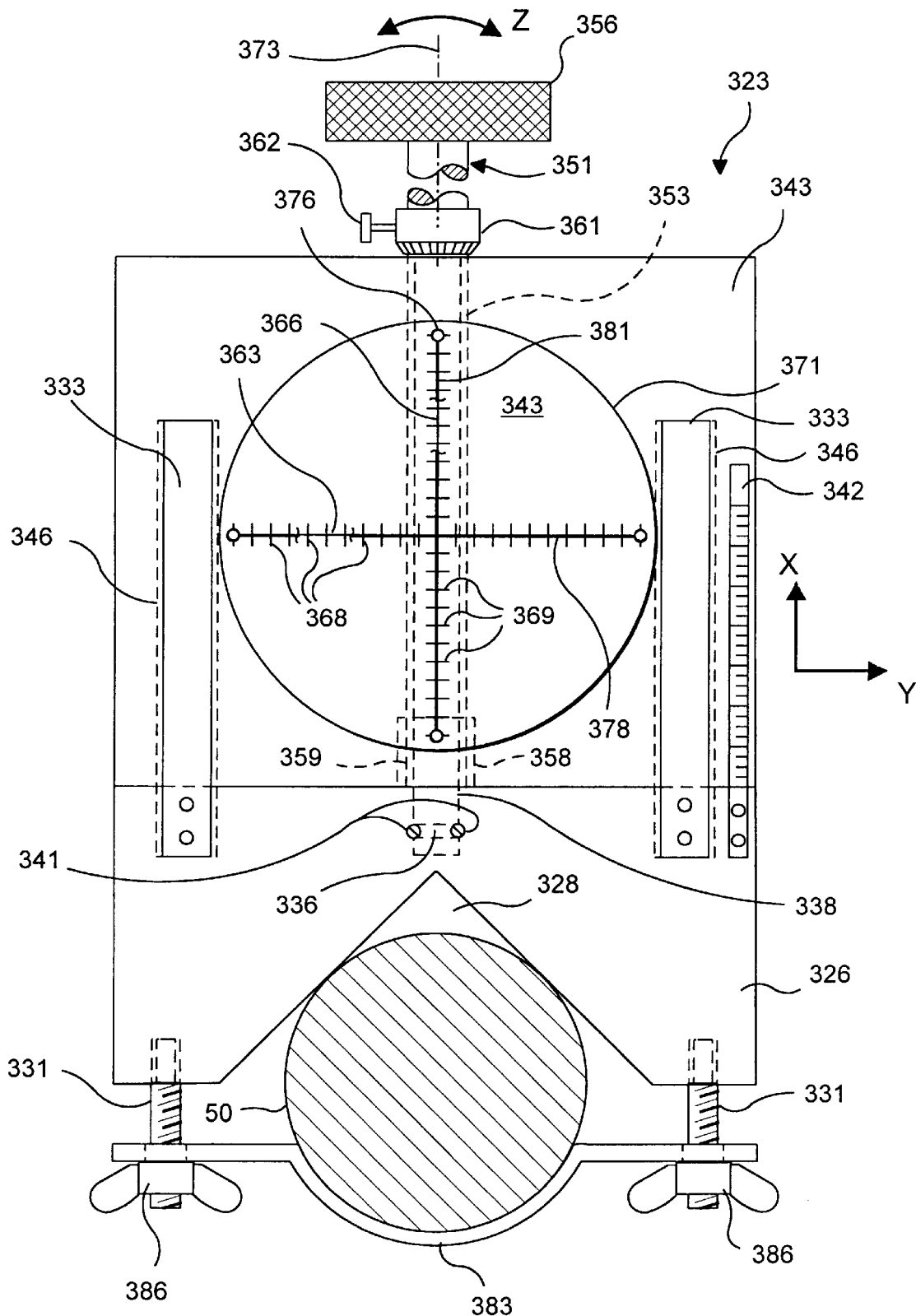
F I G. 17

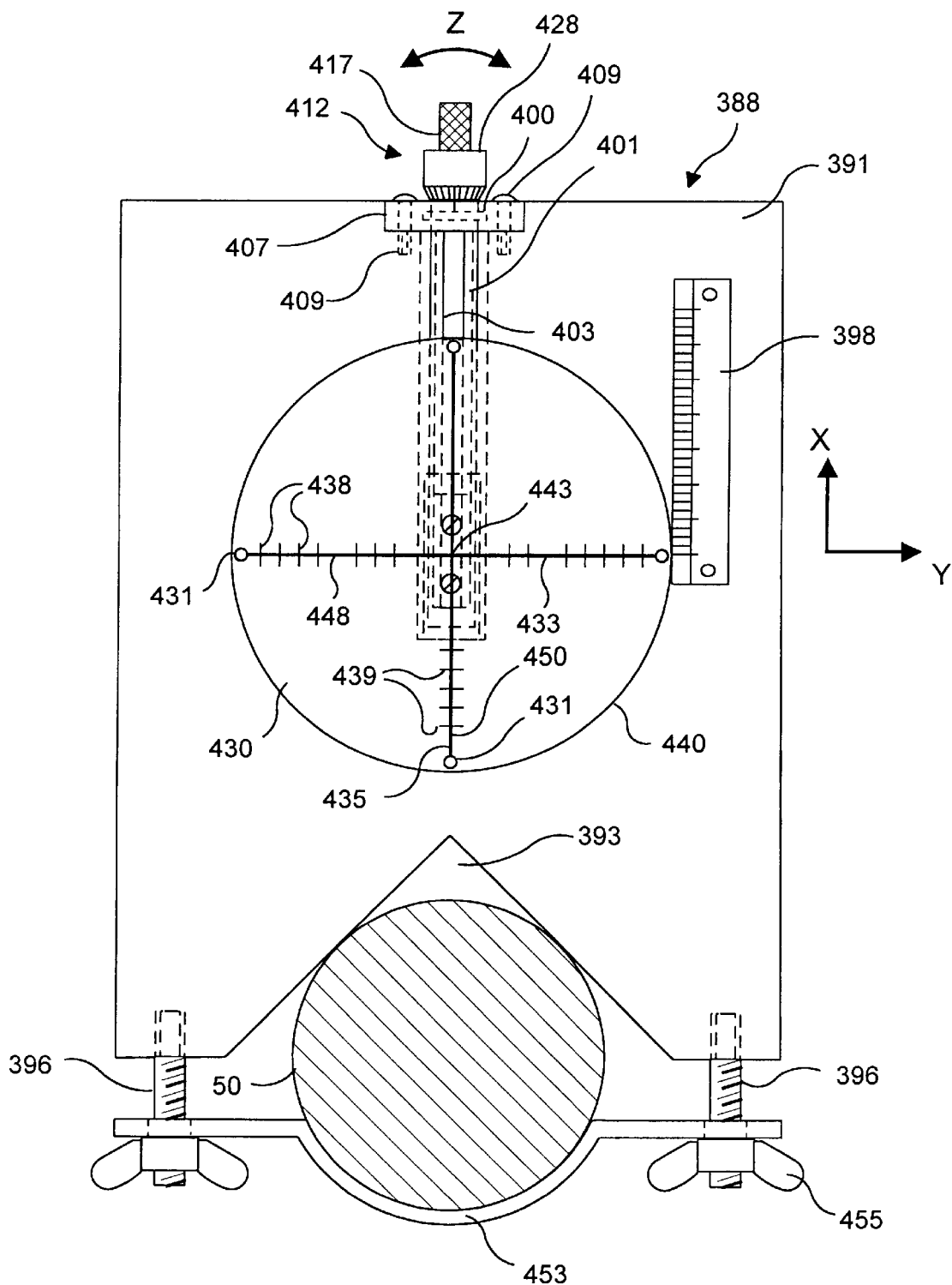
F I G. 19

LASER ALIGNMENT TOOL

BACKGROUND OF THE INVENTION

This invention relates to an alignment tool, and more particularly, to an alignment tool including a laser for detecting the alignment of precision alignment components, such as the pulleys of a belt drive system or in-line shafts of a transmission system.

In the past, pulleys of such systems have been aligned by the use of a cord line or a straight edge to indicate center alignment. Measurements must be taken accurately at four points on the pulleys; at the top, bottom and each side of the pulleys. Angular alignment requires the use of specialized gauges and instruments. These methods were less than completely satisfactory; since they are time consuming, are prone to inaccuracy, and unreliable because an adjustment of one alignment may cause the other alignments to change. Furthermore, these alignment procedures are relatively costly and require specially trained people.

U.S. Pat. No. 4,249,294 discloses an optical alignment tool which overcomes many of these limitations. The tool of this patent includes a target device releasably mountable to a pulley and an optical viewing device releasably mountable to another pulley. The optical viewing device has an eyepiece into which the user looks to view the target device. The target and optical viewing devices are mounted on interior portions of the pulleys which face one another so that the target device may be viewed through the optical viewing device. The target and optical viewing devices each have cross hairs which, when the pulleys are in the correct or preselected alignment, coincide with one another as viewed through the optical viewing device.

It may be possible to align the optical viewing device of U.S. Pat. No. 4,249,294 such that the cross hairs appear to coincide, when viewed through the optical viewing device, even though the webs of U-shaped members are oblique relative to the centerline between the pulleys. Such oblique relation may result from misalignment of the pulleys.

When viewing the optical viewing device of U.S. Pat. No. 4,249,294, the eye of the user must normally be reasonably close thereto requiring accessibility to the eye of the user. Additionally, the ability to view the target device through the optical viewing device while simultaneously adjusting the pulleys may be limited. Accordingly, alignment of the two pulleys by an individual user of the tool of U.S. Pat. No. 4,249,294 may entail an iterative process where the alignment is checked after each positioning of one or both of the pulleys.

Additionally, the optical viewing device of U.S. Pat. No. 4,248,924 may have sufficient weight to rotate the pulley on which it is mounted. Also, U.S. Pat. No. 4,248,924 does not disclose the addition of an electronic sensor to provide electrical signals indicative of when the cross hairs of the optical viewing and target devices coincide.

SUMMARY OF THE INVENTION

The laser alignment tool includes a laser beam emitter supported in a projector assembly which, when mounted on a precision alignment component, such as a pulley, is directed at a target assembly mounted on another precision alignment component. The plate of the target assembly against which the laser beam is directed is coated, textured or the like (e.g., has inscribed cross hairs) to produce a distinctive visual effect when struck by the laser with the precision alignment components in the correct or preselected alignment relative to one another. Moreover, if the precision alignment components are not in the correct or preselected alignment, impingement of the laser beam against the target plate does not produce the distinctive visual effect.

The target plate may be contoured such that the distinctive visual effect indicates that the precision alignment components are in the correct or preselected alignment relative to one another in additional orientation planes. For example, the target plate may have raised and inscribed cross hairs to indicate that the laser beam is perpendicular to the target surface.

Illumination of the target plate with a distinct visual effect allows ready determination of the correct or preselected alignment of the precision alignment components by visual observation of the target plate. Also, the narrowly focused beam of the laser enables detection of minute discrepancies between the correct or preselected, and actual alignment of the precision alignment components.

In the present invention, the target plate is viewed directly, as compared to through the optical viewing device of U.S. Pat. No. 4,249,294. "Viewing" access to the target plate of the present invention is therefore not required, as compared to the eyepiece of U.S. Pat. No. 4,249,294. While the target plate of the present invention must be viewable by the user, the eye of the user may be spaced apart and have some variety of orientations relative to the plate due to the optical properties (e.g., illumination) of the laser beam. Additionally, an individual user may determine the alignment of the precision alignment components while simultaneous adjusting their relative positions by looking at the target plate while manipulating the components. Thus, an iterative process alternating between adjusting the precision alignment components and inspecting their alignment is unnecessary.

Including a laser beam emitter having a reduced weight in the projector assembly, in turn, limits the weight thereof reducing the tendency of the assembly to downwardly displace the precision alignment component on which it is mounted. Accordingly, if, for example, the projector assembly, including a reduced weight laser beam emitter, is mounted on a pulley or shaft, a reduced mass counterweight, if any, will normally be sufficient to resist rotation thereof caused by the projector assembly.

The laser beam emitter projects a beam having sufficient energy to be sensed by an electronic sensor. The laser beam is sufficiently focused such that a precise position and orientation of the beam may sensed by a precisely sized and located electronic sensor fixed to the target plate. Thus, the target assembly may include electronic sensors mounted on the cross hairs for detecting coincidence of the cross hairs of the laser beam therewith. The electronic sensors may be electrically connected to indicator lights for indicating, or to a computer for recording, such coincidence which, in turn, indicates the precision alignment components are in the correct or preselected alignment.

Accordingly, it is an object of this invention to provide a laser alignment tool for aligning precision alignment components such as the pulleys of a belt drive system, in-line shafts of a transmission system, or the like.

It is another object of this invention to provide a laser alignment tool for precision alignment components that is simple and relatively quick to use.

It is another object of this invention to provide a laser alignment tool for precision alignment components that may be used by relatively unskilled operators.

It is another object of this invention to provide a laser alignment tool for precision alignment components that is accurate.

These and other objects, features, and advantages of the invention will be more fully understood from the following description of certain specific embodiments of the invention taken together with the accompanying drawings.

BRIEF DRAWING DESCRIPTION

In the drawing:

FIG. 14 is a side elevational view of the projector assembly of the laser alignment tool of FIG. 13 in the direction indicated by line 14—14 of FIG. 13;

FIG. 16 is a side elevational view of an alternative second embodiment of the target assembly of FIG. 13 in the direction indicated by line 16—16 thereof;

FIG. 17 is a front elevational view of the target assembly of FIG. 16 in the direction indicated by line 17—17 thereof;

FIG. 19 is a front elevational view of the target assembly of FIG. 18 in the direction indicated by line 19—19 thereof.

Corresponding reference characters indicate corresponding parts throughout the several views of the drawing.

DETAILED DESCRIPTION OF THE INVENTION

Figure 1:
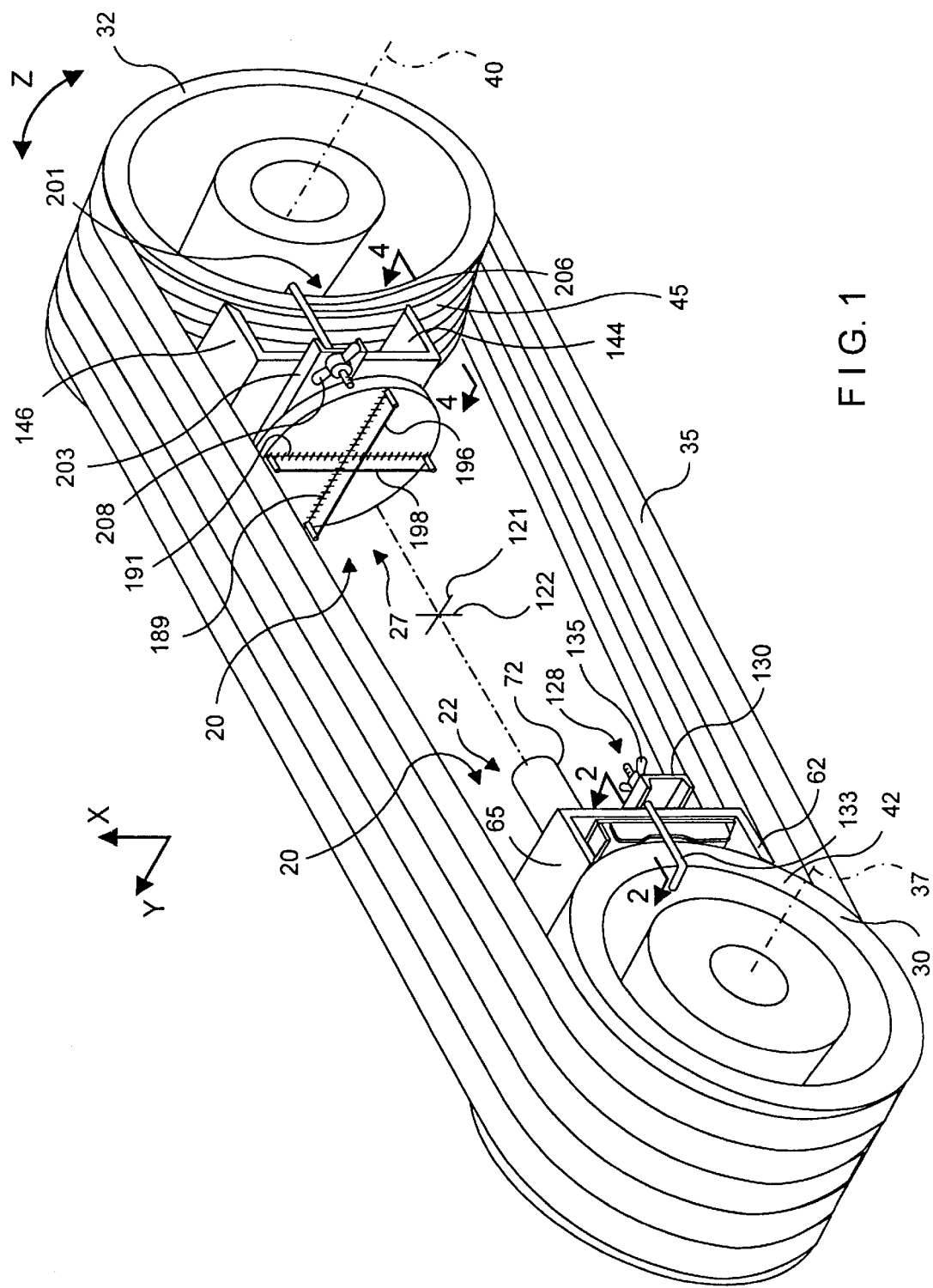
FIG. 1 is a perspective view of a laser alignment tool of the invention mounted on a pair of multiple belt pulleys.
Figure 2:
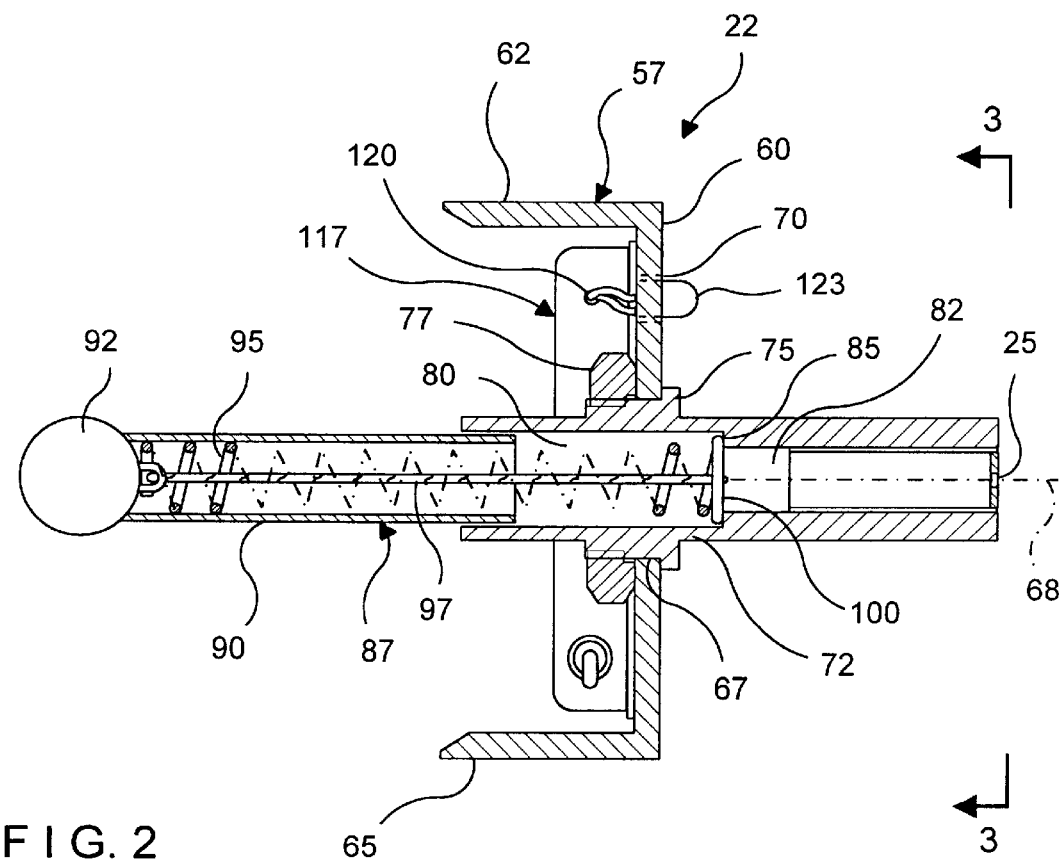
FIG. 2 is a sectional elevation view of the projector assembly of the laser alignment tool in the plane indicated by line 2—2 of FIG. 1.

Generally, laser alignment tool 20 includes a projector assembly 22 having a laser beam emitter 25 which is directed at a target assembly 27. One use of the laser alignment tool 20, but by no means the only use, is to check the alignment of a pair of pulleys 30, 32 which normally rotate about belt 35. Pulleys 30, 32 have respective central axes 37, 40 and at least one circumferential groove 42, 45. Grooves 42, 45 may be, though are not necessarily, centrally located between the side edges of pulleys 30, 32. Each pulley 30, 32 may also have a plurality of such grooves.

Another application of the laser alignment tool 20 is to check the alignment of a pair of in-line shafts 47, 50 such as may be found in a transmission. Shafts 47, 50 have respective central axis 52, 55.

Pulley Alignment—Projector Assembly

Projector assembly 22 includes a projector member 57 defined by a one-piece U-shaped channel having a projector web 60 and a pair of opposed projector legs 62, 65. The length of projector legs 62, 65 are the same and are sufficient to support projector web 60 above the outer surface of pulley 30 when projector member 57 is clamped thereto, described herein below. Projector web 60 has a centrally located projector bore 67 and an indicator bore 70 offset with relation to the projector bore. Projector bore 67 has a longitudinal central axis which is squared relative to projector web 60.

Projector assembly 22 further includes a projector means including a tubular projector housing 72 extending through projector bore 67. Fixed to the outer surface of projector housing 72 is an annular collar 75 which, when the housing is inserted through projector bore 67, abuts the outer face of projector web 60. The portion of the outer surface of projector housing 72 adjacent to the face of the web opposite collar 75 is externally threaded enabling a locking nut 77, with complimentary threads, to be screwed to the projector housing 72. When locking nut 77 is screwed to projector housing 72, such that the locking nut translates relative to the shaft in a director toward collar 75, the collar is drawn into abutment with projector web 60 thereby clamping the projector housing to the projector web. Projector housing 72 has a longitudinal central axis which, when the housing is clamped to projector web 60, is coaxial with the central axis of projector bore 67.

The internal passage through projector housing 72 is stepped such that the passage is divided into two portions 80, 82 between which is defined an annual shoulder 85. Passage portion 80 has a larger diameter than passage portion 82.

Projector assembly 22 includes a self-aligning piston 87 having a tubular piston stem 90 telescopically inserted into passage portion 80. Piston stem 90 has a longitudinal central axis which, when the stem is telescopically inserted into passage portion 80, is coaxial with the central axis of projector bore 67.

A ball-detent 92 is fixed to the outer end of piston stem 90 and a compression spring 95 is coaxially contained therein and in passage portion 80. The ends of spring 95 are seated against shoulder 85 and ball-detent 92 to bias self-aligning piston 87 away from the shoulder. A limit cord 97 is secured at one end to a pin 100 anchored to the walls of passage portion 80 in diametrical relation thereto and adjacent to shoulder 85. Limit cord 97 extends through passage portion 80 and piston stem 90 with the other end of the cord being secured to ball-detent 92. Limit cord 97 thereby limits the telescoping translation of piston stem 90 relative to projector housing 72 in a direction away from shoulder 85.

An alternative embodiment of self-aligning piston 87 includes a piston stem telescopically inserted into a projector housing 72 in a similar manner as piston stem 90 into projector housing 72. This alternative embodiment includes a bifurcated extension having a pair of cylindrical elongate legs in place of ball-detent 92 of piston 87. This alternative self-aligning piston also has a spring, limit cord and cord pin similar in structure and function to spring 95, limit cord 97 and cord pin 100 respectively, to which reference may be had for details of the corresponding parts of this alternative self-aligning piston.

The projector means further includes a laser assembly 117 having a control box 120 secured to the side of projector web 60 against which locking nut 77 abuts. Control box 120 covers indicator bore 70 and has an indicator light 123 which extends through the indicator bore to a point beyond the opposite side of projector web 60. Control box 120 also has a switch for activating laser beam emitter 25.

Laser assembly 117 further includes a power box 125 secured to the same side of projector web 60 as control box 120. Power box 125 is electrically connected to control box 120, and contains removable batteries.

Laser beam emitter 25, which is part of laser assembly 117, is coaxially secured in passage portion 82. The outer end of laser beam emitter 25 projects a laser beam having a cross section defining horizontal and vertical laser cross hairs 121, 122 the intersection of which coincides with the longitudinal central axis of the laser beam defining a laser axis 68. Laser axis 68 is coaxial with the central axis of projector bore 67.

Alternatively, the laser beam may consist of a first dot corresponding to the intersection of horizontal and vertical laser cross hairs 121, 122, and a second dot corresponding to a point on either the horizontal or vertical laser cross hairs spaced apart from the first dot.

Laser beam emitter 25 and indicator light 123 are electrically connected to power box 125 and control box 120. When laser beam emitter 25 projects the laser beam, indicator light 123 is illuminated.

Projector assembly 22 may be clamped to pulley 30 in the manner shown in U.S. Pat. No. 4,249,294, the entire disclosure of which is hereby expressly incorporated by reference herein. More specifically, the end edges of projector legs 62, 65 are placed against the outer surface of pulley 30 in transverse relation to the circumference thereof. Projector member 57 is aligned relative to pulley 30 so that ball-detent 92 may be inserted into groove 42 to longitudinally align the projector member relative to central axis 37 of pulley 30. Projector member 57 is held in this position by clamp assembly 128.

Self-aligning piston 87 is particularly well-suited for longitudinally aligning projector member 57 relative to pulley 30 along central axis 37 if pulley 30 is a variable speed pulley. Ball-detent 92 is urged by piston stem 90 into a wedged relation between the inclined inner sides of pulley 30 which support belt 35 to automatically center the belt relative thereto.

A prjector member similar to projector member 57 may also be used to align non-grooved drives. Such a projector member would work the same as laser alignment tool 20 shown in FIG. 1 mounted on a grooved drive. The function of self-aligning piston 87 is replaced by an alignment plate mounted on one side of the U-channel of projector member 57. The alignment plate is mounted squared to the U-channel of projector member 57.

In use, such an alignment plate, mounted on projector member 57, is placed against the machined face of pulley 30 with the U-channel of the projector member placed on top of pulley 30. When the legs of the U-channel engage the top of pulley 30, projector member 57 is squared to pulley 30 and paralleled to the shaft of the pulley. Laser axis 68 is perpendicular to pulley 30 and the shaft thereof.

Clamp assembly 128 includes a clamp channel 130 anchored to the outer surface of projector web 60 such that the clamp bar is midway between and parallel to projector legs 62, 65. Clamp assembly 128 further includes an L-shaped rod 133, one leg of which abuts the inner surface of pulley 30 midway between projector legs 62, 65. The other leg of L-shaped rod 133 extends radially outward relative to central axis 37 and through a hole in clamp bar 130. The portion of the leg of L-shaped rod 133 which extends through clamp channel 130 is externally threaded. Nut 135, having internal threads which compliment the external threads of the leg of L-shaped rod 133, is screwed onto the leg with a washer disposed between the nut and clamp channel 130. Translation of nut 135 along the threaded leg of L-shaped rod 133 toward the other leg thereof causes displacement of clamp channel 130 toward the other leg which, in turn, causes projector member 57 to be clamped against the outer surface of pulley 30.

The hole in clamp channel 130 may be replaced by a longitudinal slot in the web of the clamp channel allowing L-shaped rod 133 to be positioned at different points along the length thereof. Such a clamp channel 130 enables projector member 57 to be clamped to pulleys 30 having different dimensions in the direction of central axis 37.

When projector member 57 is clamped to pulley 30, projector web 60 is supported above the outer surface thereof. Projector legs 62, 65 are automatically squared to the side edges of pulley 30 such that the edges of the projector edge which abut the pulley are perpendicular to the side edges thereof. The outer surface of projector web 60 is perpendicular to a radial plane of pulley 30 which contains central axis 37 thereof. As a result when projector member 57 is clamped to pulley 30, the position and aspect of the pulley may be determined from the position and direction of laser axis 68.

If projector assembly 22 includes the alternative embodiment of self-aligning piston 87 including the bifurcated extension described herein above, projector member 57 is longitudinally aligned with respect to central axis 37 of pulley 30 by inserting both legs of the bifurcated extension into groove 42. As a result, the two legs of the bifurcated extension are seated in the bottom of groove 42 such that a sector of pulley 30 is subtended between the two legs.

Several alternatives to clamp assembly 128 are possible for clamping projector member 57 to pulley 30. Such alternatives include magnets, resilient straps with hooks at each end, rubber bands, VELCRO (trademark), straps, clips, and standard attachments.

Pulley Alignment—Target Assembly

Target assembly 27 includes a one-piece U-shaped target member 138 having a target web 141 and a pair of opposed target legs 144, 146. Target web 141 has a centrally located target bore 149, the longitudinal central axis of which defines a target axis 151 which is squared (i.e., perpendicular) relative to the target web. Target member 138 is similar in structure and function to projector member 57 to which reference may be had for details of the target member.

Target assembly 27 includes a target means including a tubular target housing 154 having a collar 156 and locking nut 159 with a washer. Collar 156 and locking nut 159 are similar in structure and function to collar 75 and locking nut 77 of projector housing 72 to which reference may be made for details of collar 156 and locking nut 159. Target housing 154 extends through target bore 149 and is clamped to target web 141 by collar 156 and locking nut 159 in a similar manner as the clamping of projector housing 72 to projector web 60.

The interior longitudinal passage of target housing 154 is divided into passage inner and outer portions 161, 164 which are separated by an annular shoulder 166 in a manner similar to the longitudinal central passage in projector housing 72. Reference may be had to such passage in projector housing 72 for further details of inner and outer portions 161, 164 and annular shoulder 166.

Target assembly 27 further includes a self-aligning piston 169 having a piston stem 171 which is telescopically inserted into the passage inner portion 161 in a similar manner as the insertion of self-aligning piston 87 into projector housing 72. Reference may be had to self-aligning piston 87 for further details about self-aligning piston 169. Piston stem 171 has a longitudinal central axis which is coaxial with target axis 151.

Self-aligning piston 169 includes a ball-detent 174 fixed to the outer end of piston stem 171. A spring 176, limit cord 179 and cord pin 181 are contained in the passage inner portion 161 and the interior longitudinal passage of piston stem 171 in a similar manner as spring 95, limit cord 97 and cord pin 100 of self aligning piston 87. Accordingly, further details of spring 176, limit cord 179 and cord pin 181 may be had by reference to spring 95, limit cord 97 and cord pin 100.

The target means includes a circular target plate 184 and a cylindrical support stub 186, having a longitudinal central axis, anchored to the rear side of the target plate. The central axis of stub 186 intersects the center of target plate 184.

Support stub 186 is inserted into passage outer portion 164 of target housing 154 such that the central axis of the support stub is coaxial with target axis 151. Target plate 184 has a flat smooth face with horizontal and vertical cross hairs 189, 191, with respective calibration marks 190, 192, inscribed thereon. Inscribed cross hairs 189, 191 may be coated with ink, paint or the like to increase their visibility.

Cross hair pins 193 are anchored to the front face of target plate 184 at each end of inscribed cross hairs 189, 191. Cross hair pins 193 each have a longitudinal central axis which is perpendicular to the front face of target plate 184 and have generally the same height above the front face of the target plate.

Horizontal and vertical raised cross hairs 196, 198 are defined by respective wires extending between diametrically opposed pairs of cross hair pins 193. Horizontal and vertical raised cross hairs 196, 198 coincide with horizontal and vertical inscribed cross hairs 189, 191 when the front face is viewed along target axis 151. The thickness of raised cross hairs 196, 198 must be less than the thickness of the laser cross hairs 121, 122.

Electronic sensors 194, 195 may be mounted on substantial interior portions of the inscribed cross hairs 189, 191 to sense impingement of the laser cross hairs 121, 122 against the inscribed cross hairs. Such sensors may be electrically connected to indicator lights 188, 200 mounted on the target plate 184 adjacent to the ends of horizontal and vertical inscribed cross hairs 189, 191. Such lights, e.g., 188, are mounted adjacent to the respective cross hairs, e.g., 189, having the electronic sensor, e.g., 194, to which the indicator light is electrically connected such that illumination of each indicator light, e.g., 188, signals that the entire laser cross hair, e.g., 121, is striking the associated inscribed cross hair, e.g., 189. Such sensors may also be electrically connected to a CPU (computer) 187 for recording impingement of the laser cross hairs 121, 122 against inscribed cross hairs 189, 191. Electronic sensors 197, 199 may also attached to raised cross hairs 196, 198 for sensing impingement of the laser cross hairs 121, 122 against the raised cross hairs in a similar manner as for inscribed cross hairs 189, 191.

Target assembly 27 includes a clamp assembly 201 having a clamp bar 203, an L-shaped rod 206, and a nut 208 with an associated washer each of which has a counterpart similar in structure and function in clamp assembly 128. Details of the components clamp assembly 201 may therefore be had from the description herein above of clamp assembly 128. Target member 138 is thereby be clamped to pulley 32 in a manner similar to that described herein above for clamping projector member 57 to pulley 30. The groove 45 into which ball-detent 174 of self-aligning piston 169 is inserted corresponds to groove 42 of pulley 30, relative to central axes 40, 37. As a result, the grooves have similar longitudinal positions along the central axes such that belt 35 is squared or perpendicular relative to the central axes and grooves.

The position of target member 138 may also be fixed relative to pulley 32 in the direction of central axis 40 by an alignment plate mounted on one side of the U-channel of target member 138, similar in structure and function to the alignment plate mounted on the projector member similar to projector member 57, described herein above. The distance between the alignment plate and target axis 151 in the direction of central axis 40 is equal to the distance between the corresponding alignment plate on projector member 57 and laser axis 68 in the direction of central axis 37. Details about such an alignment plate mounted on target member 138 may be had by reference to the alignment plate which may be mounted on the projector member similar to projector member 57, described herein above.

Laser alignment tool 20 is used to check the alignment of pulleys 30, 32 by first mounting the projector and target members 57, 138 to their respective pulleys as described herein above. Pulleys 30, 32 may be rotated, as required, so that the portions thereof supporting the projector and target assemblies 22, 27 define the minimum distance between the pulleys, i.e., the distance between projector housing 72 and target plate 184 is minimized. Counterweights may be required to hold pulleys in these rotational positions. Laser beam emitter 25 is then energized by moving the switch to the necessary position.

Target plate 184 is visually examined to determine any offset between the laser cross hairs 121, 122 and the inscribed and raised cross hairs 189, 191, 196, 198. Offset between the vertical laser cross hair 122 and vertical inscribed cross hairs 191, 198 indicates horizontal misalignment between pulleys 30, 32. Calibration marks 190 facilitate determination of the amount of offset. Relative displacement of pulleys 30, 32 relative to one another in the Y-direction, as shown in FIGS. 1, 3 and 5, is therefore required.

Offset between horizontal laser cross hair 121 and horizontal inscribed cross hairs 189, 196 indicates vertical misalignment between pulleys 30, 32. Calibration marks 192 facilitate determination of the amount of offset. Relative displacement of pulleys 30, 32 relative to one another in the X-direction, as shown in FIGS. 1, 3 and 5, is therefore required.

Figure 3:
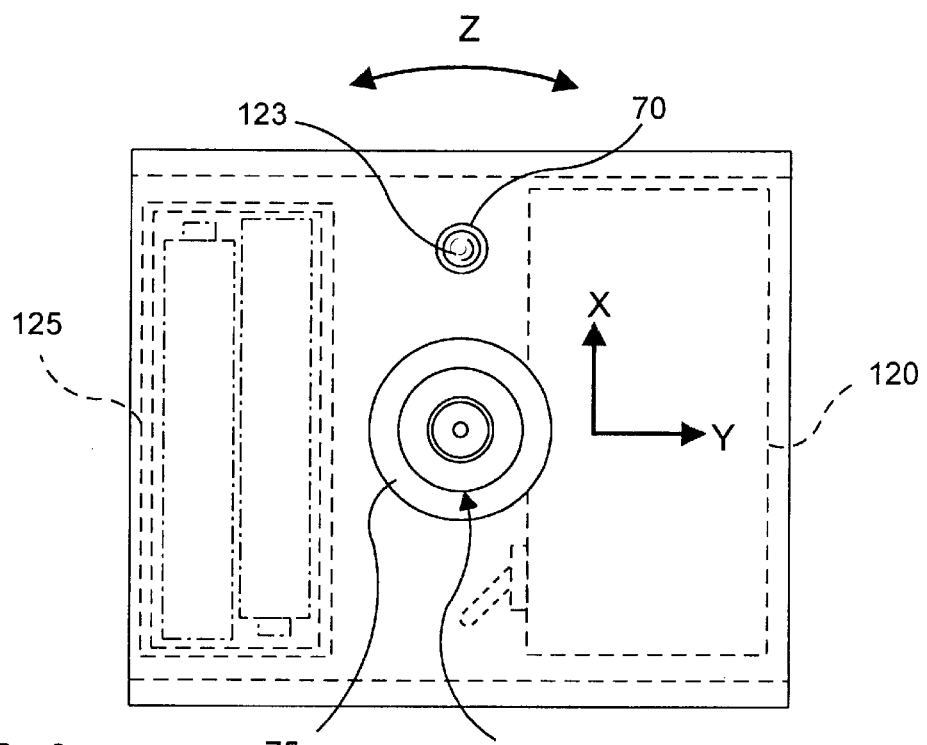
FIG. 3 is a front view of the projector assembly in the direction indicated by line 3—3 of FIG. 2.
Figure 4:
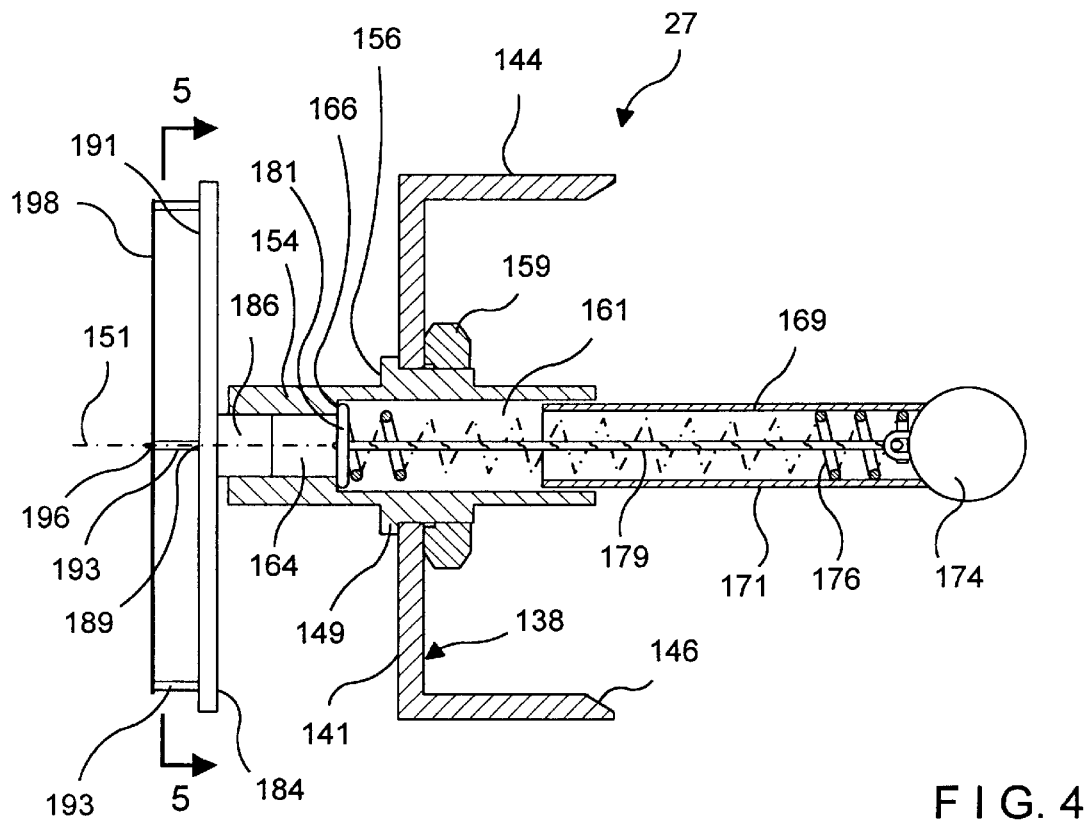
FIG. 4 is a sectional elevation view of the target assembly of the laser alignment tool in the plane indicated by line 4—4 of FIG. 1.
Figure 5:
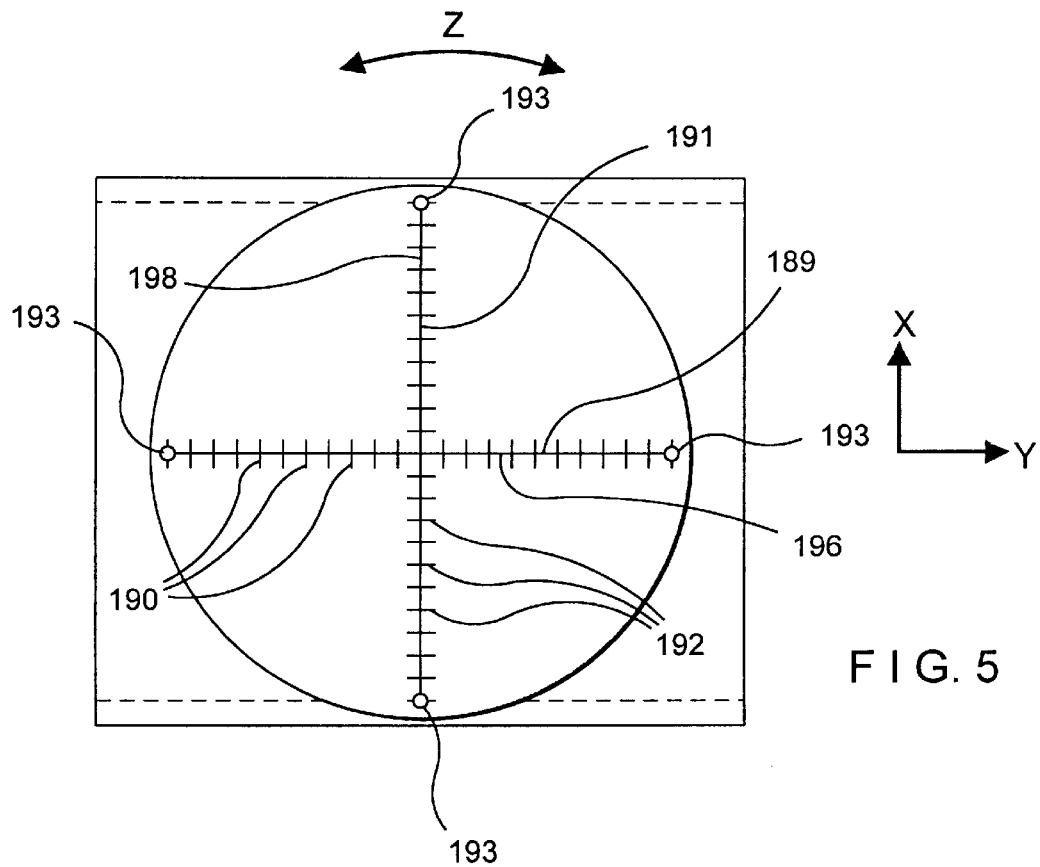
FIG. 5 is a front view of the target assembly in the direction indicated by line 5—5 of FIG. 4.
Figure 6:
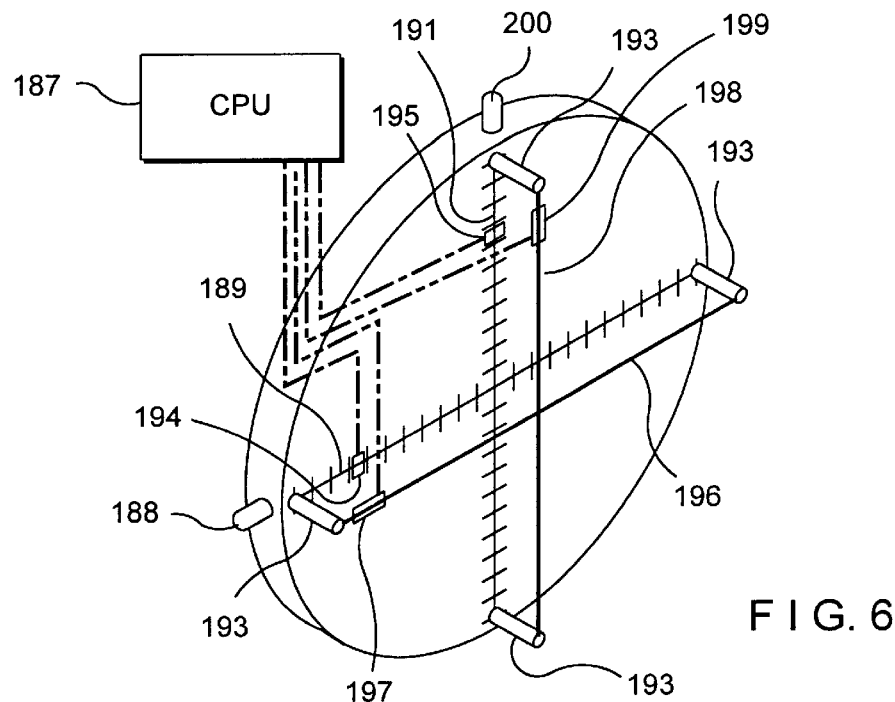
FIG. 6 is a perspective view of the target plate showing the raised cross hairs, electronic sensors, indicator lights, and CPU (computer) of the target assembly of FIG. 4.

Inclination of the laser cross hairs 121, 122 relative to inscribed and raised cross hairs 189, 191, 196, 198 indicates angular misalignment of pulleys, 30, 32 in the Z-direction, as shown in FIGS. 1, 3 and 5. Such misalignment normally produces twisting of belt 35. Such misalignment is corrected by rotating pulleys 30, 32 relative to one another about respective laser and target axes 68, 151. Impingement of the laser cross hairs 121, 122 against either inscribed cross hairs 189, 191 or raised cross hairs 196, 198, but not on both, indicates inclination of laser axis 68 relative to target plate 184, i.e., projector and target webs 60, 141 are not parallel. If pulleys 30, 32 are in the correct or preselected alignment, laser axis 68 is perpendicular to target plate 184. Accordingly, when pulleys 30, 32 are in the correct or preselected alignment, laser cross hairs 121, 122 impinge against both raised and inscribed cross hairs 196, 198, 189, 191.

If, on the other hand, laser cross hairs 121, 122 and raised and inscribed cross hairs 196, 198, 189, 191 are in the correct or preselected alignment in the X- and Z-directions, but misaligned or offset in the Y-direction, as shown in FIGS. 1, 3 and 5, the vertical laser cross hair 122 and vertical inscribed cross hair 191 may coincide if laser axis 68 is suitably inclined in the horizontal plane with respect to target plate 184. Such misalignment or offset would, however, result in the vertical laser cross hair 122 not impinging vertical raised cross hair 198. Thus, the misalignment or offset in the Y-direction would be detected, even though the vertical laser cross hair 122 would coincide with the vertical inscribed cross hair 191. Similar misalignment or offset in the X-direction would be detected by the absence of horizontal laser cross hair 121 impinging on horizontal raised cross hair 196.

In summary, pulleys 30, 32 are in the correct or preselected alignment with laser axis 68 perpendicular to target plate 184 when the horizontal laser cross hair 121 coincides with horizontal raised and inscribed-cross hairs 196, 189, and the vertical laser cross hair 122 coincides with vertical raised and inscribed cross hairs 198, 191.

If the laser beam includes first and second dots, described herein above, impingement of the first dot against the intersection of inscribed cross hairs 189, 191, and impingement of the second dot against a preselected one of the inscribed cross hairs. Increased spacing between the first and second dots results in increased accuracy.

Inclination of laser axis 68 relative to target plate 184 may also be indicated by mounting a piece of plate glass thereon. Impingement of the laser beam against such plate glass, when laser axis 68 is inclined relative thereto, will result in a pair of images being readily visible thereon because of the diffractive properties of glass. When visually inspecting the impingement of the laser beam against such glass, the eyes of the user are preferably shielded by eyeglasses or the like which filter portions of the laser beam unnecessary for viewing the images.

Inclination of laser axis 68 relative to target plate 184 may also be indicated by the images of laser cross hairs 121, 122 having unequal lengths relative to the intersection of inscribed cross hairs 189, 191.

Impingement of laser cross hairs 121, 122 against the inscribed and raised cross hairs 189, 191, 196, 198 may be detected by the electronic sensors 194, 195, 197, 199 and indicated by associated indicator lights 188, 200 and recorded by CPU (computer) 187 as described herein above.

A target plate similar to target plate 184 may be rotatably mounted on target housing 154 via support stub 186 to indicate preselected angular alignments of central axes 37, 40 including both perpendicular and non-perpendicular orientations. Such a target plate may have calibration marks or gradations to indicate such angular positions thereof.

Additionally, projector and target members 57, 138 may have levelers (e.g., bubble in fluid containing tube) attached thereto to indicate horizontal surfaces.

Stencil Plate

Figure 7:
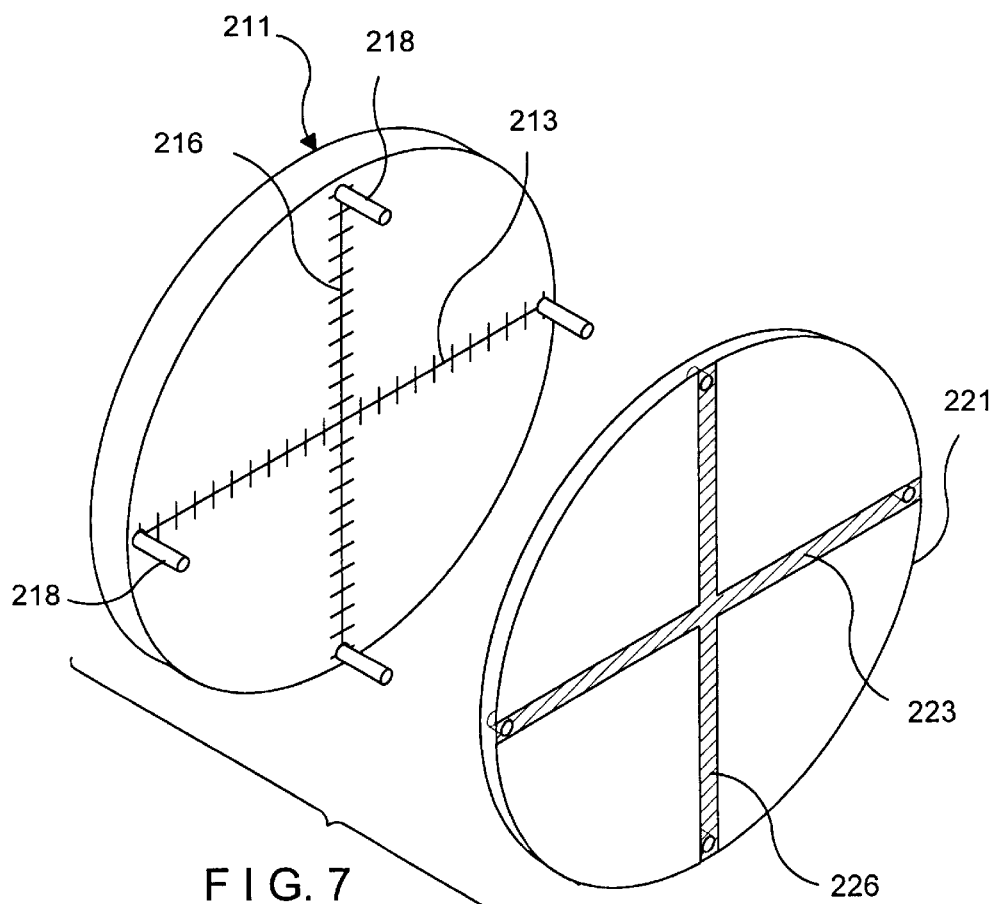
FIG. 7 is a view corresponding to FIG. 6 showing a target plate and a raised transparent stencil plate having opaque cross hairs of an alternative second embodiment of the target assembly of FIG. 4.

An alternative embodiment of target plate 184 is designated by reference character 211 in FIG. 7. Target plate 211 is similar in structure and function to target plate 184 and has horizontal and vertical inscribed cross hairs 213, 216 and cross hair pins 218 which are similar in structure and function to horizontal and vertical inscribed cross hairs 189, 191 and cross hair pins 193 of target plate 184. Accordingly, details of these components of target plate 211 may be had by reference to the counterpart components of target plate 184. A circular stencil plate 221 is secured to the outer ends of cross hair pins 218 in parallel relation to target plate 211 such that the centers of target and stencil plates are coaxial. Stencil plate 221 has generally the same diameter as target plate 211. Stencil plate 221 has horizontal and vertical opaque cross hairs 223, 226 which, when viewed along target axis 151, coincide with horizontal and vertical inscribed cross hairs 213, 216. The remainder of stencil plate 221 is transparent.

The relative positions of pulleys 30, 32 in the X, Y and Z-directions and any inclination of laser axis 68 relative to target plate 211 (i.e., whether the pulleys are in the correct or preselected alignment) is indicated by impingement of the laser cross hairs against opaque cross hairs 223, 226 and inscribed cross hairs 213, 216 in a similar manner as impingement of laser cross hairs 121, 122 against raised cross hairs 196, 198 and inscribed cross hairs 189, 191. Accordingly, details of the alignment indications provided by impingement of laser cross hairs with opaque cross hairs 223, 226 and inscribed cross hairs 213, 216 may be had by reference to the description of the indications provided by impingement of laser cross hairs 121, 122 with raised cross hairs 196, 198 and inscribed cross hairs 189, 191 described herein above.

Opaque cross hairs 223, 226 and inscribed cross hairs 213, 216 may have respective electronic laser sensors for sensing impingement of laser cross hairs 121, 122 similar to the electronic sensors 194, 195, 197, 199 described herein above. The electronic sensors for opaque cross hairs 223, 226 and inscribed cross hairs 213, 216 may be electronically connected to indicator lights and a CPU (computer) similar to indicator lights 188, 200 and CPU (computer) 187 described herein above. Impingement of laser cross hairs 121, 122 against opaque cross hairs 223, 226 and inscribed cross hairs 213, 216 causes illumination of such indicator lights and may be recorded on the computer in a similar manner as indicator lights 188, 200 and CPU (computer) 187. Details of such electronic laser sensors indicator lights and computer for opaque cross hairs 223, 226 and inscribed cross hairs 213, 216 may be had by reference to indicator lights 188, 200 and CPU (computer) 187 described herein above.

Figure 8:
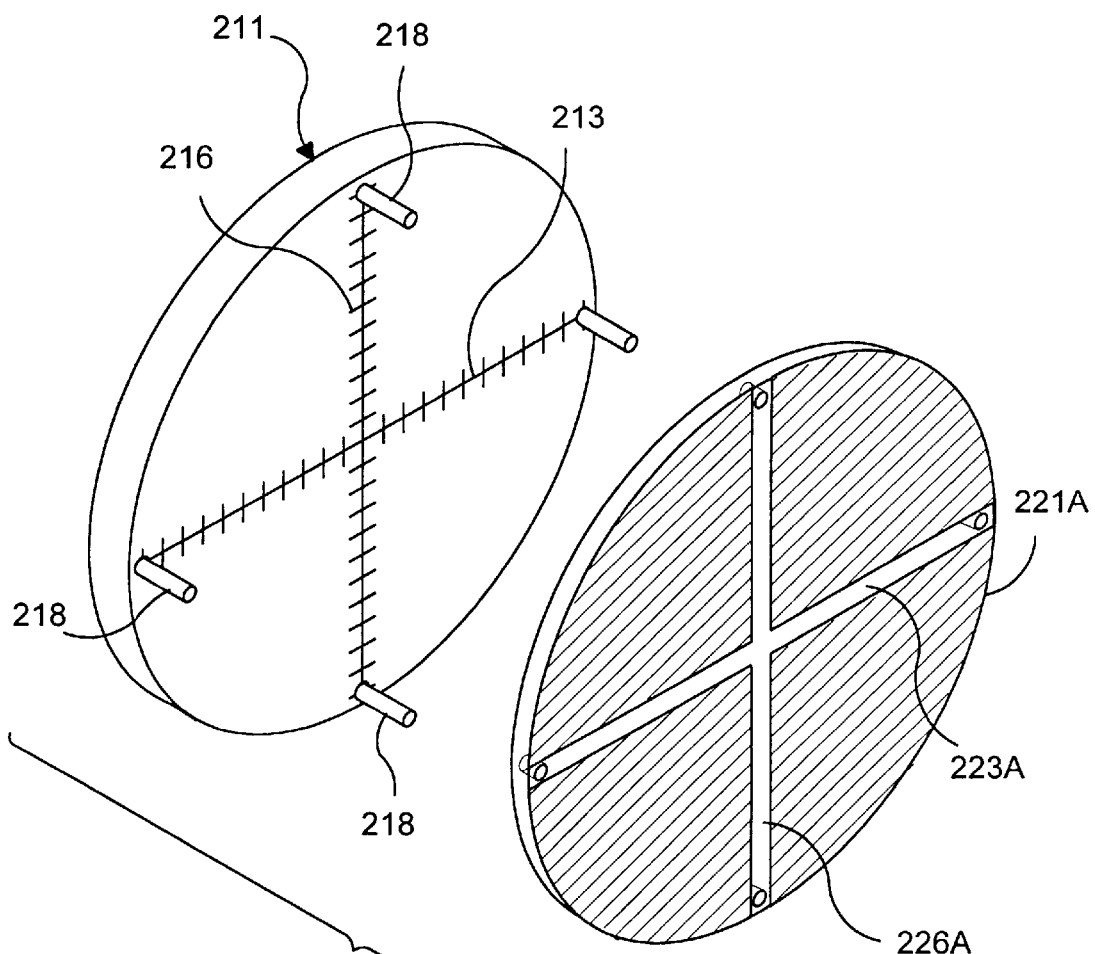
FIG. 8 is a view corresponding to FIG. 7 showing a target plate and a raised opaque stencil plate having transparent cross hairs of an alternative third embodiment of the target assembly of FIG. 4.

An alternative embodiment of stencil plate 221, designated by reference numeral 221A in FIG. 8, has transparent cross hairs with the remainder of the plate being opaque. Parts in FIG. 8 having corresponding parts in FIG. 7 have the same reference numeral with the addition of suffix A. Passage of horizontal and vertical laser cross hairs 121, 122 through the transparent horizontal and vertical cross hairs 223A, 226A indicates that pulleys 30, 32 are in the correct or preselected alignment in the X, Y and Z-directions and that laser axis 68 is perpendicular to target plate 211.

If however, pulleys 30, 32 are in the correct or preselected alignment in the X and Z-directions but are misaligned or offset in the Y-direction, horizontal laser cross hair 121 may nevertheless coincide with horizontal inscribed cross hair 213 if laser axis 68 is suitably inclined in the horizontal plane. However, such inclination of laser axis 68 will prevent the entire vertical laser cross hair 122 from passing through vertical transparent cross hair 226A and impinging against vertical inscribed cross hair 216. An inclination of laser axis 68 in the horizontal plane is possible resulting in the central portion of vertical laser cross hair 122 passing through horizontal transparent cross hair 223A and striking the central portion of inscribed vertical cross hair 216 with the remainder of the vertical laser cross hair being blocked by the opaque sections of stencil plate 221A. Impingement of such a limited portion of vertical laser cross hair 122 against vertical inscribed cross hair 216 will be readily visually observable to indicate misalignment of pulleys 30, 32. An alternative inclination of laser axis 68 in the horizontal plane is also possible resulting in vertical laser cross hair 122 passing through transparent vertical cross hair 226A and impinging against target plate 211; such impingement, however, would be offset from vertical inscribed cross hair 216 which would also be readily visually observable to indicate misalignment of pulleys 30, 32. Similar readily visual indications result from inclination of laser axis 68 in the vertical plane indicative of misalignment of pulleys 30, 32.

Electronic sensors may be applied to horizontal and vertical inscribed cross hairs 213, 216 used with stencil plate 221A similar in structure and function to the electronic sensors 194, 195, 197, 199 described herein above. Such electronic sensors may be electronically connected to indicator lights and a CPU (computer) similar in structure and function to indicator lights 188, 200 and CPU (computer) 187. Details of such electronic sensors, indicator lights and CPU (computer) for inscribed cross hairs 213, 216 opposite stencil plate 221A may be had by reference to electronic sensors 194, 195, 197, 199, indicator lights 188, 200 and CPU (computer) 187 described herein above.

As described above, stencil plate 221A having transparent cross hairs 223A, 226A obstructs impingement by the entire lengths of both laser cross hairs 121, 122 against respective horizontal and vertical inscribed cross hairs 213, 216 when laser axis 68 is inclined relative to target plate 211. Accordingly, electronic sensors on horizontal and vertical cross hairs 213, 216 are sufficient to detect alignment of pulleys 30, 32 in the X, Y and Z-directions and inclination of projectors axis 68 relative to target plate 211; electronic sensors on transparent cross hairs 223A, 226A are not required.

Recessed cross hairs

Figure 9:
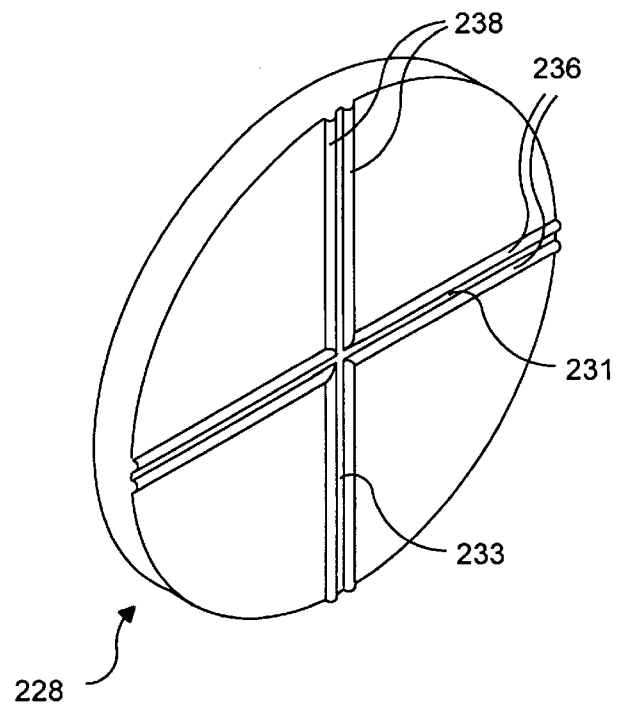
FIG. 9 is a view corresponding to FIG. 6 showing a target plate having slatted cross hairs of an alternative third embodiment of the target assembly of FIG. 4.

Another alternative to target plate 184 is target plate 228 shown in FIG. 9. Details of target plate 228 may be had by reference to target plate 184 described herein above which has a similar structure and function. Target plate 228 has horizontal and vertical channels defined by pairs of slats 236, 238 fixed to the outer face of the target plate, as shown in FIG. 9. The sides of slats 236, 238 are perpendicular to the outer face of the target plate 228. Horizontal and vertical recessed cross hairs 231, 233 disposed in the base of the channels defined by the respective pairs of slats 236, 238.

The relative alignment of pulleys 30, 32 is indicated by impingement of laser cross hairs 121, 122 against horizontal and vertical recessed cross hairs 231, 233. For example, if horizontal and vertical laser cross hairs 121, 122 coincide with horizontal and vertical recessed cross hairs 231, 233, then pulleys 30, 32 are in the correct or preselected alignment in the X, Y and Z-directions and laser axis 68 is perpendicular to target plate 228. If however laser axis 68 is inclined relative to target plate 241, then laser cross hairs 121, 122 will impinged either the outer face of target plate 241 or the interior side walls of slats 236, 238 between which are disposed horizontal and vertical recessed cross hairs 231, 233. Thus, alignment of pulleys 30, 32 in the X, Y and Z directions, with laser axis 68 being perpendicular to target plate 241 is required for horizontal and vertical laser cross hairs 121, 122 to impingement against horizontal and vertical recessed cross hairs 231, 238, respectively.

Electronic sensors similar to electronic sensors 194, 195 may be secured to horizontal and vertical recessed cross hairs 231, 233 to detect impingement of laser cross hairs 121, 122 against the recessed cross hairs. Details of such electronic sensors may be had by referring to electronic sensors 194, 195. Such electronic sensors may be electrically connected to indicator lights and a CPU (computer) similar to indicator lights 188, 200 described herein above. Such indicator lights and CPU (computer) enable indication and recording of impingement of laser cross hairs 121, 122 against horizontal and vertical recessed cross hairs 231, 233 in a similar manner as indicator lights 188, 200 and CPU (computer) 187 described herein above. Details of such indicator lights and computer may be had by reference to indicator lights 188, 200 and CPU (computer) 187.

Electronic sensors secured to horizontal and vertical recessed cross hairs 243, 246 enable detection of correct or preselected alignment between pulleys 30, 32 in the X, Y and Z-directions as well as perpendicular orientation of laser axis 68 relative to target plate 241. Additional electronic sensors, such as the electronic sensors 197, 199 secured to raised cross hairs 196, 198, are not required.

Figures 10, 11:
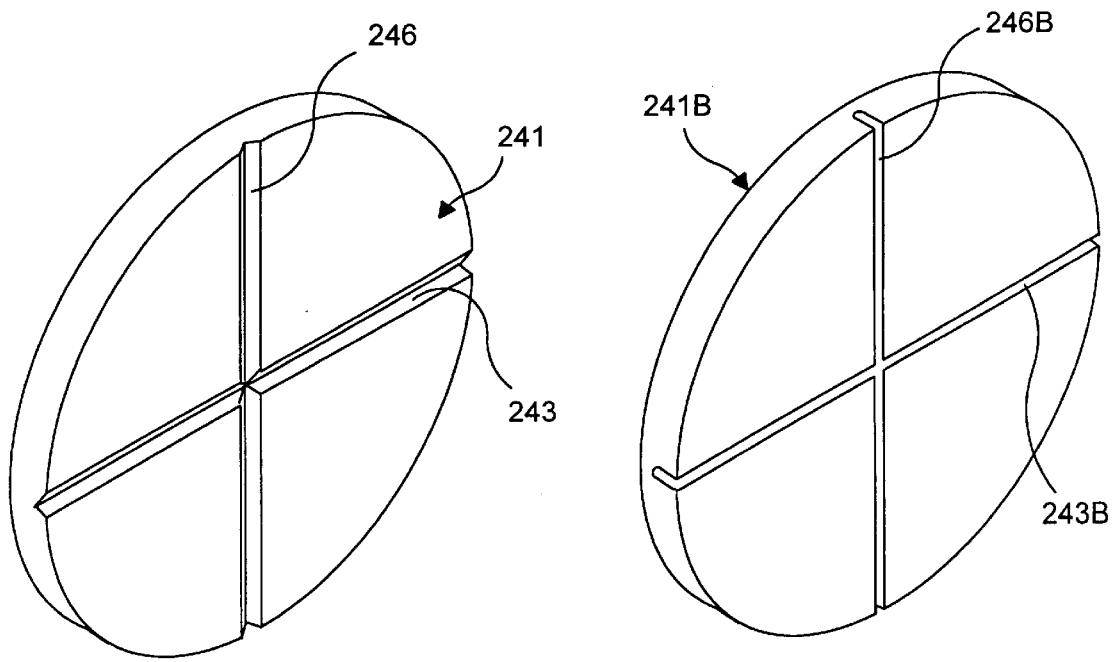
FIG. 10 is a view corresponding to FIG. 6 showing a target plate having U-shaped recessed cross hairs of an alternative fourth embodiment of the target assembly of FIG. 4.
FIG. 11 is a view corresponding to FIG. 6 showing a target plate having V-shaped recessed cross hairs of an alternative fifth embodiment of the target assembly of FIG. 4.

Another alternative to target plate 184 is target plate 241 is shown in FIG. 10. Details of target plate 241 may be had by reference to target plate 184 which is similar in structure and function. Target plate 241 has horizontal and vertical inscribed cross hairs 243, 246 defined by the interior bases of respective longitudinal recesses having V-shaped cross sections. It may be more preferable for the V-shaped cross section to constitute the base of a trough having sides perpendicular to the face of target plate 241.

The relative alignment of pulleys 30, 32 is indicated by impingement of laser cross hairs 121, 122 against horizontal and vertical inscribed cross hairs 243, 246. For example, if horizontal and vertical laser cross hairs 121, 122 impinge against horizontal and vertical recessed cross hairs 243, 246, then pulleys 30, 32 are in the correct or preselected alignment in the X, Y and Z-directions and laser axis 68 is perpendicular to target plate 228, as described above for inscribed cross hairs 231, 233 disposed between slats 236, 238, depicted in FIG. 9. If, however, laser axis 68 is inclined relative to target plate 241, then laser cross hairs 121, 122 will impinge against either the outer face of target plate 241 or the interior side walls of the longitudinal recesses the bottoms of which define horizontal and vertical recessed cross hairs 243, 246.

Electronic sensors may be secured to horizontal and vertical recessed cross hairs 243, 246 for detecting impingement of laser cross hairs 121, 122 against the cross hairs in a similar manner as described above for recessed cross hairs 231, 233. Indicator lights and a computer may be electrically connected to recessed cross hairs 243, 246 for indicating and recording alignment of pulleys 30, 32, as described above for recessed cross hairs 231, 233.

Another alternative to target plate 184 is target plate 241B shown in FIG. 11. Target plate 241B is similar to target plate 241 except that horizontal and vertical inscribed cross hairs 243B, 246B are defined by the interior bases of respective longitudinal recesses having U-shaped cross sections. Parts in FIG. 11 having corresponding parts in FIG. 10 have the same reference numeral with the addition of suffix B. The U-shaped cross section of the longitudinal recesses of target plate 241B may be less preferable than V-shaped cross sections in target plate 241. The structure and use of target plate 241B is otherwise similar to target plate 241 to which reference may be had for details about target plate 241B.

Figure 12:
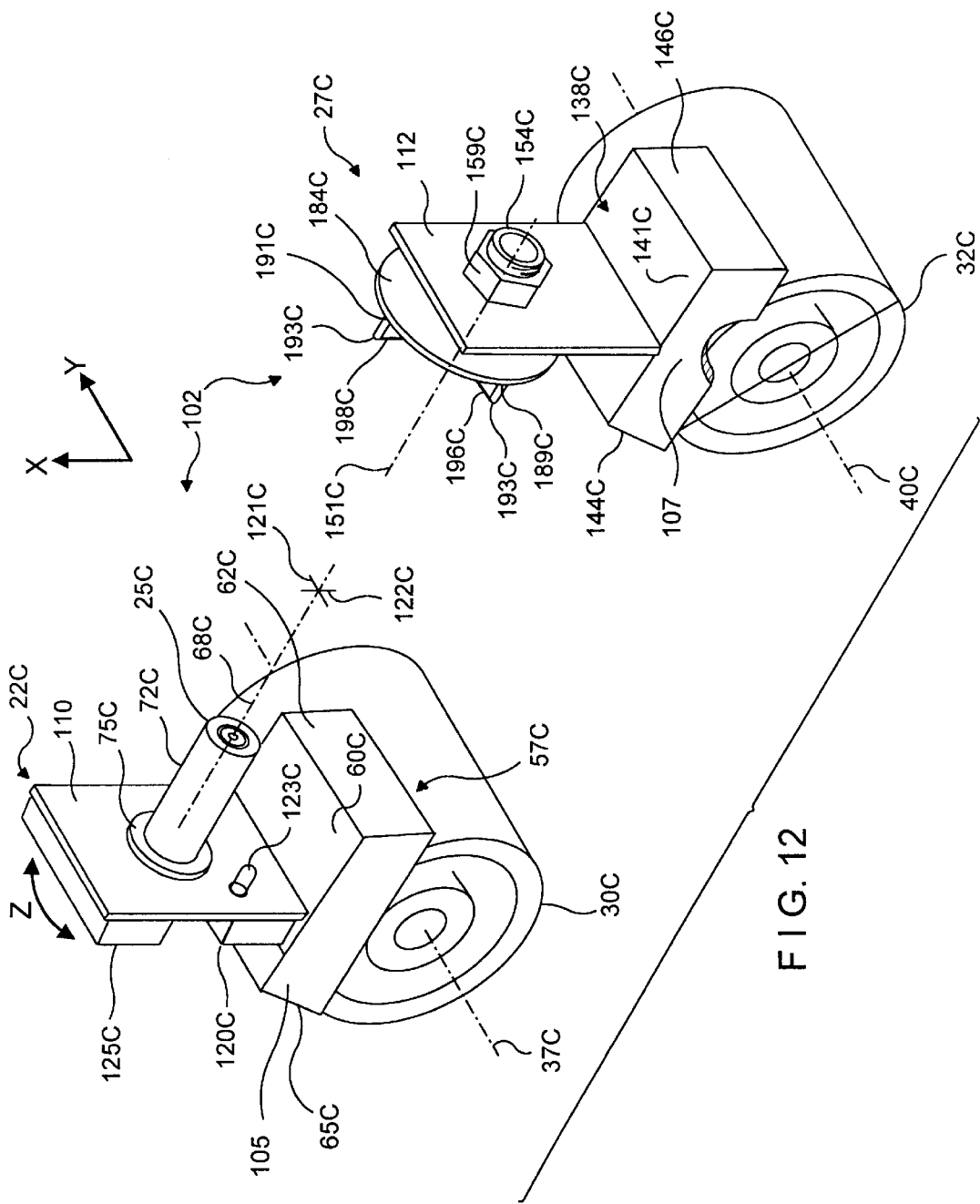
FIG. 12 is a perspective view, in partial schematic, of an alternative second embodiment of the laser alignment tool of FIG. 1 shown mounted on a pair of pulleys, a portion of target alignment plate being shown broken away.

A laser alignment tool 102 for indicating the alignment of a pair of non-grooved pulleys is shown in FIG. 12. Parts of laser alignment tool 102 corresponding in structure and function to parts of laser alignment tool 20 are designated by the same reference numeral with the addition of suffix C. Laser alignment tool 102 includes projector and target members 57C, 138C defined by respective one-piece generally U-shaped channels including projector and target legs 62C, 65C, 144C, 146C. As shown in FIG. 12, projector and target legs 62C, 65C, 144C, 146C may be inclined relative to projector and target webs 60C, 141C, respectively. Projector and target legs 62C, 65C, 144C, 146C engage pulleys 30C, 32C in a similar manner as projector and target legs 62, 65, 144, 146 of projector and target members 57, 138.

Projector and target members 57C, 138C include alignment plates 105, 107 anchored to the opposed side edges of projector and target legs 62C, 65C, 144C, 146C, as shown in FIG. 12. When projector and target legs 62C, 65C, 144C, 146C engage pulleys 30C, 32C, as shown in FIG. 12, alignment plates 105, 107 abut the side edges of the respective pulleys to longitudinally align projector and target members 57C, 138C relative to the pulleys along central axes 37C, 40C.

Projector and target assemblies 22C, 27C include respective projector and target means each, in turn, having projector and target supports 110, 112. Projector and target supports 110, 112 are constituted by respective plates anchored to projector and target webs 60C, 141C in perpendicular relation thereto, as shown in FIG. 12. Carried on projector support 110 is projector housing 72C containing a laser beam emitter 25C. Carried on target support 112 is a target plate 184C having inscribed cross hairs and raised cross hairs 196C, 198C.

The alignment of pulleys 30C, 32C is indicated by impingement of the horizontal and vertical laser cross hairs 121C, 122C projected by laser beam emitter 25C against raised and inscribed cross hairs 193C, 198C, 189C, 191C in a similar manner as described herein above for pulleys 30, 32 using laser alignment tool 20. Accordingly, reference may be had to such description for details of such alignment indication provided by laser alignment tool 102.

In-line Shafts

Figure 13:
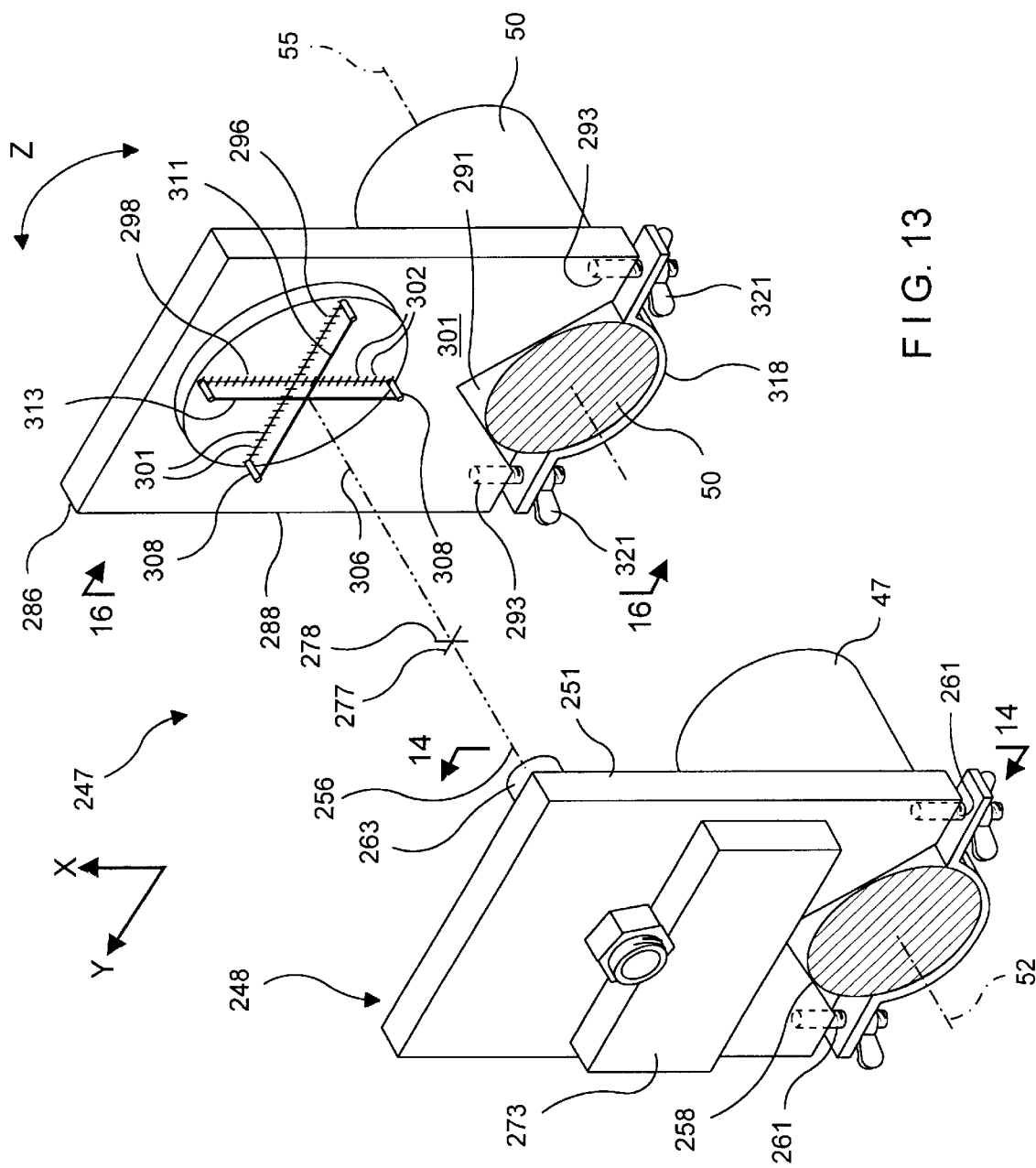
FIG. 13 is a perspective view of an alternative third embodiment of the laser alignment tool of FIG. 1 shown mounted on a pair of in-line shafts.

A laser alignment tool 247 for indicating the alignment of a pair of in-line shafts 47, 50 is shown in FIG. 13. Alignment tool 247 includes a projector assembly 248 having a rectangular projector member or plate 251 and projector bore 253 located midway between the longer sides of the projector plate and in an offset position relative to the shorter sides of the plate. Projector bore 253 has a longitudinal central axis perpendicular to projector plate 251. The bottom edge of projector plate 251 has a V-shaped notch 258 centrally located between the longer sides of the plate. Outboard of notch 258 on either side thereof are externally threaded studs 261 extending from the bottom of projector plate 251 perpendicular thereto.

Projector assembly 248 includes a projector means including a tubular projector housing 263 extending through projector bore 253 such that the central longitudinal axis of the projector housing coincides with the central axis of projector bore 253. Projector housing 263 is clamped to projector plate 251 by a collar 266 and locking nut 268 including a washer, in a similar manner as the clamping of projector housing 72 to projector web 60 by collar 75 and locking nut 77. Details of the structure and function of collar 266 and locking nut 268 may therefore be had by reference to the description herein above of collar 75 and locking nut 77.

The projector means of alignment tool 247 includes a laser assembly 271 having a control/power box 273 secured to the side of projector plate 251 against which locking nut 268 abuts. Control/power box 273 includes a switch for activating laser beam emitter 276 which is electrically connected thereto. Control power box 273 may be powered by removable batteries.

Laser beam emitter 276 is secured in the internal passage of projector housing 263. The outer end of laser beam emitter 276 projects a laser beam having a cross section defining horizontal and vertical laser cross hairs 277, 278 the intersection of which coincides with the longitudinal central axis of the laser beam defining a laser axis 256. Laser axis 256 is coaxial with the central axis of projector bore 253.

Figure 15:
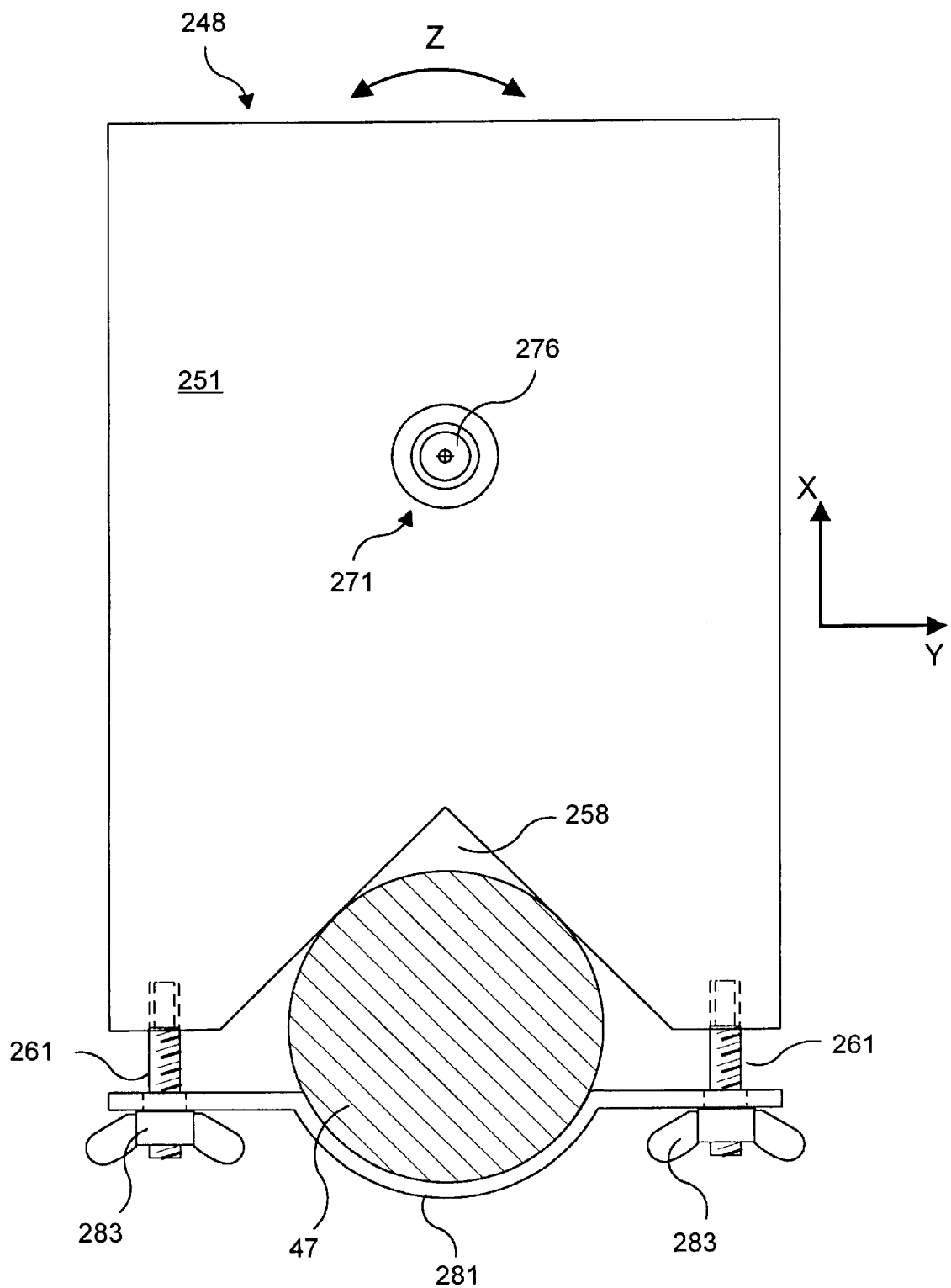
FIG. 15 is a front elevational view of the projector assembly of FIG. 14 in the direction indicated by line 15—15 thereof.

Projector plate 251 is clamped to shaft 47 by a strap 281 having an arcuate intermediate portion and wing nuts 283 having internal threads complementing the external threads on studs 261. Projector plate 251 is attached to shaft 47 by first placing the projector plate on the shaft such that notch 258 straddles the shaft as shown in FIG. 15. Strap 281 is then placed on shaft 47 in diametrically opposed relation to projector plate 251. Wing nuts 283 are screwed to threaded studs 261 to draw strap 281 and projector plate 251 together. Projector plate 251 is thereby clamped to shaft 47 in a self-aligning manner such that the projector plate is automatically oriented in a transverse cross-sectional plane of shaft 47.

Alignment tool 247 further includes a target assembly 286 including a target member or plate 288. The lower edge of target plate 288 has a V-shaped notch 291 and a pair of studs 293 similar in structure and function to notch 258 and studs 261 of projector plate 251. Details of notch 291 and studs 293 may therefore be had by reference to notch 258 and studs 261 described herein above.

The upper portion of target plate 288, including horizontal and vertical inscribed cross hairs 296, 298, with respective calibration marks 301, 302, defines a target means. Horizontal and vertical inscribed cross hairs 296, 298 and calibration marks 301, 302 are similar in structure and function to horizontal and vertical inscribed cross hairs 189, 191 and calibration marks 190, 192. Details of horizontal and vertical inscribed cross hairs 296, 298, and calibration marks 301, 302 may therefore be had by reference to horizontal and vertical inscribed cross hairs 189, 191 and calibration marks 190, 192 described herein above.

A target axis 306 is defined as an axis which intersects the intersection of inscribed cross hairs 296, 298 and is perpendicular to the plane containing both cross hairs. Target assembly 286 includes cross hair pins 308 and raised horizontal and vertical cross hairs 311, 313 which are similar in structure and function to horizontal and vertical raised cross hairs 196, 198. Details of cross hair pins 308 and raised cross hairs 311, 313 may therefore be had by reference to cross hair pins 193 and raised cross hairs 189, 191 described herein above.

Target assembly 286 includes a strap 318 and wing nuts 321 for clamping target plate 288 to shaft 50. Strap 318 and wing nuts 321 are similar in structure and function to strap 281 and wing nuts 283. Details of strap 318 and wing nuts 321 may therefore be had by reference to strap 281 and wing nuts 283, described herein above.

The alignment of shaft 47, 50 is indicated by alignment tool 247 by first clamping projector plate 251 to shaft 47 using strap 281, as described herein above, such that the end of projector housing 263 containing laser emitter 276 faces generally toward in-line shaft 50. Target plate 288 is likewise mounted on in-line shaft 50 using strap 318 as described herein above. In-line shafts 47, 50 are rotated relative to one another as needed to orient projector plate 251 in facing relation to target plate 288, i.e., laser axis 256 intersects target plate 288. Counterweights may be required to hold in-line shafts 47, 50 in these rotational positions.

The alignment of in-line shaft 47, 50 in the X, Y and Z-directions, as shown in FIG. 13, and the inclination of laser axis 256 relative to target plate 288 is then indicated in the same manner as for pulleys 30, 32 using target plate 184. Details of the manner of indicating the alignment of in-line shafts 47, 50 by impingement of laser cross hairs 277, 278 against target plate 288 may therefore be had by reference to the indicating of alignment of pulleys 30, 32 by impingement of laser cross hairs against target plate 184 described herein above.

Adjustable Target Assemblies

An alternative to target assembly 286 is shown in FIGS. 16 and 17 as target assembly 323. Target assembly 323 includes a target member or anchor plate 326 having a bottom edge with a centrally located V-shaped notch 328 and downwardly extending studs 331 on either side of the notch. Notch 328 and studs 331 are similar in structure and function to notch 258 and studs 261. Accordingly, details of notch 328 and studs 331 may be had by reference to notch 258 and studs 261, described herein above.

Fixed in and extending upwardly from the top edge of anchor plate 326 are a pair of guide posts 333 equally spaced from respective side edges of the anchor plate. Extending downward from the top edge of and into anchor plate 326 midway between the side edges thereof is a recessed cylindrical bushing seat 336. A bushing 338 is seated in bushing seat 336 and anchored thereto by bushing pins 341.

An offset means includes an elongate measuring scale 342, the lower end of which is pinned to one of the faces of anchor plate 326 between one of the guide posts 333 and the adjacent edge of target plate 343. Measuring scale 342 extends upwardly above the top edge of anchor plate 326 and has a graduated scale on the outer surface thereof.

Target assembly 323 includes a target means including a target plate 343 having upwardly extending guide passages 346 which open from the bottom edge of the target plate. The spacing of the guide passages 346 relative to the bottom edge of target plate 343 complements the spacing of guide post 333 relative to the top edge of anchor plate 326 enabling the guide post to be inserted into the guide passages.

Target plate 343 has a cylindrical bolt passage 348 extending between the top and bottom edges of the target plate. Bolt passage 348 is coaxial with bushing seat 336 when guide post 333 are inserted into guide passages 346.

The offset means further includes an adjustment bolt 351 having an externally threaded shaft 353 extending through the entire length of both passage 348. The lower end of shaft 353 is supported in bushing 338 so that the shaft is rotatable relative to anchor and target plates 326, 343 and is fixed axially relative to the anchor plate. Fixed to the top end of shaft 353 is a knob 356 having a knurled side for manually rotating the shaft.

The offset means includes a micrometer threaded block 358 disposed in bolt passage 348 and fixed to target plate 343. Threaded block 358 has a bore 359, the central longitudinal axis of which coincides with the central longitudinal axis of bolt passage 348. Bore 359 has internal threads complementing the external threads on shaft 353 enabling shaft 353 to be screwed through the threaded block such that rotation of the shaft, by rotating knob 356, causes the threaded block to translate relative to the shaft along the longitudinal central axis thereof. Target plate 343, in turn, is carried along shaft 353 thereby translating relative to anchor plate 326 in a direction parallel to guide posts 333. Measuring scale 342 enables measurement of a space between target plate 343 and anchor plate 326 resulting from such relative translation of the target plate relative to the anchor plate.

The offset means includes a micrometric ring 361 coaxially surrounding shaft 353 between knob 356 and the top edge of target plate 343. A radial clearance exists between micrometric ring 361 and shaft 353 allowing the ring to translate longitudinally relative to the shaft. A locking screw 362 extends radially through micrometric ring 361 into engagement with shaft 353 to fix the position of the ring relative thereto. The circumferential lower surface of micrometric ring 361 has circumferential micrometric calibrations or gradations.

Target plate 343 has horizontal and vertical inscribed cross hairs 363, 366 each having respective calibration marks 368, 369 disposed within inscribed circle 371 similar to inscribed cross hairs 296, 298, calibration marks 301, 302 and inscribed circle 303 described herein above. Inscribed cross hairs 363, 366 are formed on the face of target plate 343 facing measuring scale 342. A clearance exists between target plate 343 and measuring scale 342 enabling relative translation between the target plate and measuring scale.

Target axis 373 is defined as the axis intersecting the intersection of inscribed horizontal and vertical cross hairs 363, 366 and parallel to the plane containing the cross hairs in a similar manner as target axis 306, described herein above. Cross hair pins 376 support horizontal and vertical raised cross hairs 378, 381 in a similar manner as cross hair pins 308 and raised cross hairs 311, 313, described herein above. Details of the structure and function of inscribed cross hairs 363, 366, calibration marks 368, 369, inscribed circle 371, and target axis 373 may be had by reference to the corresponding parts of target assembly 286 discussed herein above.

Anchor plate 326 is clamped to shaft 50 by a strap 383 and wing nuts 386 in a similar manner as the clamping of target plate 288 to in-line shaft 50 by strap 318 and wing nut 321 described herein above. Accordingly details of the structure and function of strap 383 and wing nuts 386 may be had by reference to the description herein above of strap 281 and wing nuts 283, respectively.

The alignment of in-line shafts 47, 50 is indicated by the impingement of the projection of laser cross hairs 277, 278 against raised and inscribed cross hairs 378, 381, 363, 366 in a similar manner as against raised and inscribed cross hairs 311, 313, 296, 298. Details of determining the alignment using projector and target assemblies 248, 323 may therefore be had by reference to projector and target assemblies 248, 286 described herein above.

Measuring scale 342, and micrometric ring 361 enable alignment between shafts 47, 50 which are coaxial and have different outer diameters, or which have a transverse offset between central axes 52, 55 since each results in a corresponding offset between laser and target axes 256, 373. Offset between laser and target axes 256, 373 is indicated by aligning the lower edge of target plate 343 with the corresponding gradation on measuring scale 342, and aligning micrometric ring 361 so that a reference gradation on the lower surface thereof aligns with a corresponding reference gradation along the upper edge of target plate 343. Locking screw 362 is then engaged against shaft 353 to fix the position of micrometric ring 361 relative to shaft. Micrometric ring 361 is then rotated a preselected amount, measured by the angular displacement of the reference gradation on micrometric ring 361 relative to the corresponding reference gradation on target plate, to finely adjust the position of target plate 343 relative to anchor plate 326.

Figure 18:
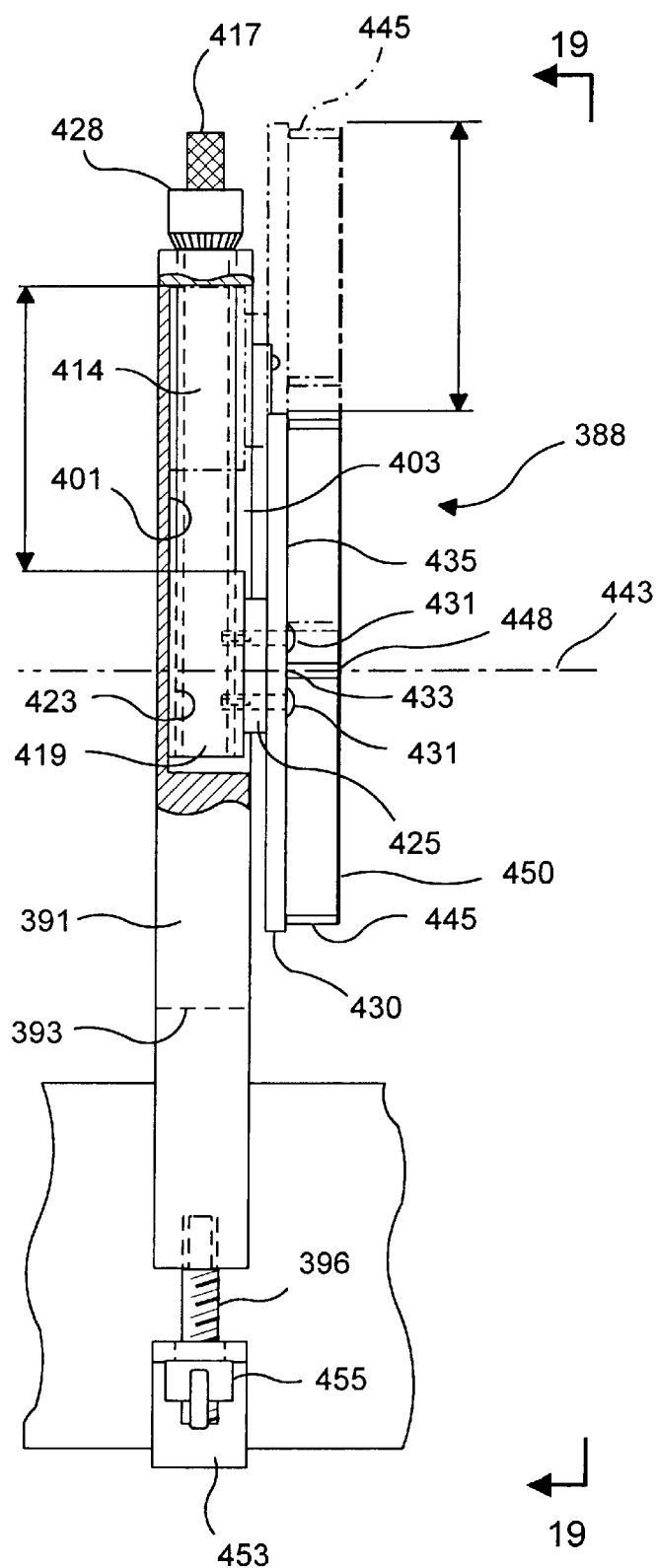
FIG. 18 is a view corresponding to FIG. 16 showing an alternative third embodiment of the target assembly of FIG. 13.

A second alternative to target assembly 286 is shown in FIGS. 18 and 19, and designated by the reference character 388. Target assembly 388 includes a target member 391 comprising a plate having a lower edge with a V-shaped notch 393 and studs 396 on either side thereof. Notch 393 and studs 396 are similar in structure and function to notch 291 and studs 293 to which reference may be had for details of notch 393 and studs 396. An offset means includes a measuring scale 398 is pinned to the upper portion of one of the faces of target member 391.

Target member 391 has a downwardly extending elongate recess opening from the top edge thereof. The counter sunk top of the elongate recess defines a bushing seat 400 in which is seated a bushing 407 pinned to target member 391 by bushing pins 409. The remainder of the elongate recess defines a coupling track 401 opening, via a coupling slot 403, to the face of target member 391 to which measuring scale 398 is pinned.

The offset means includes an adjustment bolt 412 having an externally threaded shaft 414 extending through the entire length of coupling track 401. The upper end of shaft 414 is supported in bushing 407 allowing the shaft to rotate relative to target member 391 and fixing the shaft axially relative thereto. The upper end 417 of shaft 414 is knurled for manual rotation thereof by grasping the knurled end.

The offset means has a one-piece micrometer threaded block located in coupling track 401. The micrometer threaded block includes a block base 419 with a complementary cross section to that of coupling track 401. Block base 419 has a bore 423 with internal threads complementing the external threads of shaft 414. Threaded bore 423 is coaxially aligned with the rotational axis of bushing 407 enabling shaft 414 to be screwed through bore 423. The micrometer threaded block also has a coupling tab 425 extending through coupling slot 403. Rotation of shaft 414 causes block base 419 to translate relative to the shaft along the longitudinal central axis thereof resulting in concomitant translation of coupling tab 425.

The offset means includes a micrometric ring 428 coaxially surrounding shaft 353 between upper end 417 and the top edge of target member 391. Micrometric ring 428 is axially and rotationally fixed to shaft 353. The circumferential lower surface of micrometric ring 428 has circumferential micrometric calibrations or gradations.

A target means including a circular target plate 430 is anchored to coupling tab 425 by two target pins 431 as shown in FIG. 18. Accordingly, target plate 430, carried by coupling tab 425, translates relative to target member 391 in a direction parallel to the longitudinal axis of coupling track 401 when upper end 417 of adjustment bolt 412 is rotated. Measuring scale 398 is positioned relative to target plate 430 so that the displacement of the target plate may be readily measured. Target plate 430 has horizontal and vertical inscribed cross hairs 433, 435 each having respective calibration marks 438, 439 and contained in an inscribed circle 440. Inscribed cross hairs 433, 435, calibration marks 438, 439, and inscribed circle 440 are similar in structure and function to inscribed horizontal and vertical cross hairs 296, 298, calibration marks 301, 302 and inscribed circle 303, respectively.

Target axis 443 intersects the point at which horizontal and vertical inscribed cross hairs 433, 435 intersect and is perpendicular to the plane containing the cross hairs. Cross hair pins 445 support horizontal and vertical raised cross hairs 448, 450 similar in structure and function to cross hair pins 308 and horizontal and vertical raised cross hairs 311, 313 described herein above. Details of cross hairs 433, 435, 433, 435 calibration marks 438, 439, circle 440, and pins 445 may be had by reference to the corresponding parts associated with target plate 288, described herein above.

Target member 391 is clamped to in-line shaft 50 by a strap 453 and wing nuts 455. Details of the structure and function of strap 453 and wing nut 455 may be had by reference to strap 318 and wing nuts 321 of target assembly 286 which are similar in structure and function.

Micrometric ring 428 and measuring scale 398 enables the position of target plate 430 to be finely adjusted relative to target member 391 in a similar manner as micrometric ring 361 and measuring scale 342. Details of alignment of shafts 47, 50 using micrometric ring 428 and measuring scale 398 may be had by reference to the description herein above for such alignment using micrometric ring 361 and measuring scale 398, except that operation of a part corresponding to locking screw 362 is not required since the position of micrometric ring 428 is fixed relative to shaft 353.

A target plate similar to target plate 430 may be rotatably mounted on target member 391 via coupling tab 425. Such a target plate may have calibration marks or gradations to indicate such angular positions thereof.

Also, a target plate similar to target plate 430 may be pivotally mounted on the upper edge of target member 391 (e.g., midway between the side edges of the target member or adjacent to either) to pivot about a vertical axis to indicate preselected angular alignments of central axes 52, 55 including both perpendicular and non-perpendicular orientations. Such a target plate may have calibration marks or gradations to indicate such angular positions thereof.

Additionally, projector member 251 and target members 288, 326, 391 may have levelers (e.g., bubble in fluid containing tube) attached thereto to indicate horizontal surfaces.

The inscribed and raised cross hairs of target assemblies 286, 323, 388 may be used with or replaced by a stencil plate, slats or recessed cross hairs similar in structure and function to stencil plate 221, slats 236, 238 or recessed cross hairs, 243, 246 described above in connection target assembly 27. Details of the structure and use of such a stencil plate, slats and recessed cross hairs in target assemblies 286, 323, 388 may be had by reference to the corresponding components in target assembly 27.

Similarly, electronic sensors may be applied to the cross hairs of target assemblies 286, 323, 388, with or without a stencil plate, slats or recessed cross hairs, in a similar manner as electronic sensors 194, 195, 197, 199 applied to the cross hairs of target assembly 27, stencil plate 221, slats 236, 238 and recessed cross hairs 243, 246. Details of such electronic sensors in target assemblies 286, 323, 388 may be had by reference to electronic sensors 194, 195, 197, 199 which may be included in target assembly 27, described herein above, having a similar structure and function. Such electronic sensors included in target assemblies 286, 323, 388 may be electrically connected to indicator lights or a computer in a similar manner as the electrical connection of electronic sensors 194, 195, 197, 199 to indicator lights 188, 200 and CPU (computer) 187. Details of such indicator lights and computer may be had by reference to indicator lights 188, 200 and CPU (computer) 187 which are similar in structure and function.

While the invention has been described by reference to certain preferred embodiments, it should be understood that numerous changes could be made within the spirit and scope of the inventive concept described. Accordingly, it is intended that the invention not be limited to the disclosed embodiments, but that it have the full scope permitted by the language of the following claims.

What is claimed is:

1. A laser alignment tool for aligning precision alignment components in a preselected angular alignment relative to one another, said laser alignment tool comprising:

projector and target members releasably mountable on respective ones of the precision alignment components in fixed annular orientations relative thereto;

projector means including a laser beam emitter for emitting a laser beam having a longitudinal central axis defining a laser axis, said laser axis having a predetermined angular position with respect to said projector member corresponding to the preselected alignment; and target means including a target surface having a predetermined angular position with respect to said target member corresponding to the preselected angular alignment of the precision alignment components, said target surface being perpendicular to said laser axis when the alignment of the precision alignment components corresponds to the preselected angular alignment, said target means including indicia means on said target surface which, when the precision alignment components have the preselected angular alignment, produce a distinctive visual effect from impingement of the laser beam from said laser beam emitter against said target surface, wherein said target surface is contoured in a direction perpendicular thereto such that impingement of said laser beam against said target surface, when said laser axis is oblique thereto, causes deflection of said laser beam resulting in a second distinctive visual effect indicating angular displacement of the precision alignment components away from the preselected angular alignment.

2. A laser alignment tool as set forth in claim 2 wherein said laser beam projects horizontal and vertical cross hairs the intersection of which coincides with said laser axis, said target means including horizontal and vertical cross hairs inscribed on said target surface, said target means further including raised horizontal and vertical cross hairs supported above said target surface in respective planes containing said inscribed horizontal and vertical cross hairs which are perpendicular to said target surface, said raised horizontal and vertical cross hairs defining said contouring such that, when the alignment of said precision alignment components corresponds to the preselected angular alignment, said horizontal and vertical laser cross hairs coincide with said horizontal and vertical raised and inscribed cross hairs.

3. A laser alignment tool as set forth in claim 2 and further comprising a plurality of electronic sensors each of which is mounted on a respective one of said horizontal and vertical raised and inscribed cross hair such that, when said horizontal and vertical laser cross hairs impinge against respective ones of said raised and inscribed cross hairs, said respective ones of said electronic sensors produce distinctive electronic signals indicating such impingement.

* * * * *